(12) United States Patent
Nataga et al.

(10) Patent No.: US 7,953,115 B2
(45) Date of Patent: May 31, 2011

(54) WIRELESS PACKET COMMUNICATION METHOD

(75) Inventors: Kengo Nataga, Kanagawa (JP); Tomoaki Kumagai, Kanagawa (JP); Shinya Otsuki, Kanagawa (JP); Kazuyoshi Saito, Toyko (JP); Satoru Aikawa, Kanagawa (JP); Akinori Hirukawa, Kanagawa (JP); Atsushi Ohta, Kanagawa (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1340 days.

(21) Appl. No.: 10/542,209

(22) PCT Filed: Jun. 18, 2004

(86) PCT No.: PCT/JP2004/008911
§ 371 (c)(1),
(2), (4) Date: Jul. 14, 2005

(87) PCT Pub. No.: WO2004/114609
PCT Pub. Date: Dec. 29, 2004

(65) Prior Publication Data
US 2006/0139201 A1 Jun. 29, 2006

(30) Foreign Application Priority Data

| Jun. 18, 2003 | (JP) | 2003-173914 |
| Jun. 18, 2003 | (JP) | 2003-173953 |
| Jun. 20, 2003 | (JP) | 2003-177096 |
| Jun. 20, 2003 | (JP) | 2003-177097 |
| Aug. 18, 2003 | (JP) | 2003-207699 |
| Oct. 8, 2003 | (JP) | 2003-349223 |
| Jan. 26, 2004 | (JP) | 2004-017247 |
| May 27, 2004 | (JP) | 2004-158078 |

(51) Int. Cl.
*H04J 3/24* (2006.01)

(52) U.S. Cl. ............ 370/474; 370/465
(58) Field of Classification Search ............ None
See application file for complete search history.

(56) References Cited

U.S. PATENT DOCUMENTS 6,735,223 B1 * 5/2004 Woo et al. ............ 370/516
(Continued)

FOREIGN PATENT DOCUMENTS

| JP | 05-035624 A | 2/1993 |
| JP | 09-055776 A | 2/1997 |
| JP | 11-154989 A | 6/1999 |
| JP | 2002-064459 A | 2/2002 |
| JP | 2003-101604 A | 4/2003 |

OTHER PUBLICATIONS

International Standard ISO/IEC 8802-11 ANSI/IEEE Std 802.11, 1999 edition, Information technology—Telecommunications and information exchange between systems—Local and metropolitan area networks—Specific requirements—Part 11: Wireless LAN Medium Access Control (MAC) and Physical Layer (PHY) specifications.

(Continued)

*Primary Examiner* — Chi H Pham
*Assistant Examiner* — Mohammad S Adhami
(74) *Attorney, Agent, or Firm* — Harness, Dickey & Pierce, P.L.C.

(57) ABSTRACT

When a transmission rate of each of lines that transmit data simultaneously between two STAs by using a plurality of radio channels and/or MIMO can be set independently, one data frame is fragmented in accordance with the transmission rates of the respective lines so as to generate a plurality of data packets having the same packet time length and data sizes equal to or smaller than a maximum data size. Those data packets are transmitted simultaneously by using a plurality of radio channels, or one radio channel and MIMO, or a plurality of radio channels and MIMO.

4 Claims, 30 Drawing Sheets

U.S. PATENT DOCUMENTS

| | | | | |
|---|---|---|---|---|
| 7,046,651 | B2* | 5/2006 | Terry | 370/338 |
| 2002/0051433 | A1* | 5/2002 | Affes et al. | 370/335 |
| 2002/0142723 | A1* | 10/2002 | Foschini et al. | 455/59 |
| 2002/0163879 | A1* | 11/2002 | Li et al. | 370/200 |
| 2003/0012222 | A1* | 1/2003 | Rinchiuso | 370/468 |
| 2003/0074669 | A1 | 4/2003 | Kobayashi et al. | |
| 2003/0185241 | A1* | 10/2003 | Lu et al. | 370/476 |
| 2004/0213184 | A1* | 10/2004 | Hu et al. | 370/335 |
| 2005/0008092 | A1* | 1/2005 | Kadous | 375/267 |
| 2007/0263657 | A1* | 11/2007 | Sugar et al. | 370/465 |

OTHER PUBLICATIONS

IEEE Std 802.11-1997, Information technology—Telecommunications and information exchange between systems—Local and metropolitan area networks—specific requirements—Part 11: Wireless LAN Medium Access Control (MAC) and Physical Layer (PHY) specifications.

Low-powered Data Communication System/Broadband Mobile Access Communication System (CSMA) standard, ARIB STD-T71 version 1.0, Association of Radio Industries and Businesses (with English Translation).

Kurosaki et al., "1000Mbit/s SDM-COFDM over MIMO Channel for Broadband Communications", Technical Report of the Institute of Electronics, Information and Communication Engineers, A P2001-96, RCS2001-135.

Iizuka et al., "5 GHz Wireless LAN System Based on the IEEE 802.11a standard—Packet Transmission Characteristics-", B-5-124, Proceedings of the Electronics Information and Communication Engineers, Society Conference 2000 (with English Translation).

* cited by examiner

FIG. 5
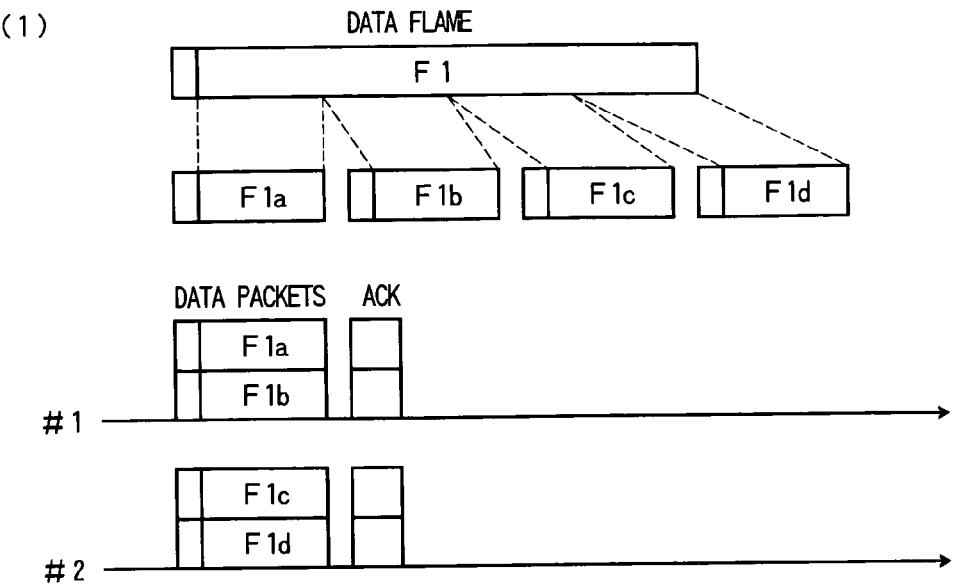
(1)
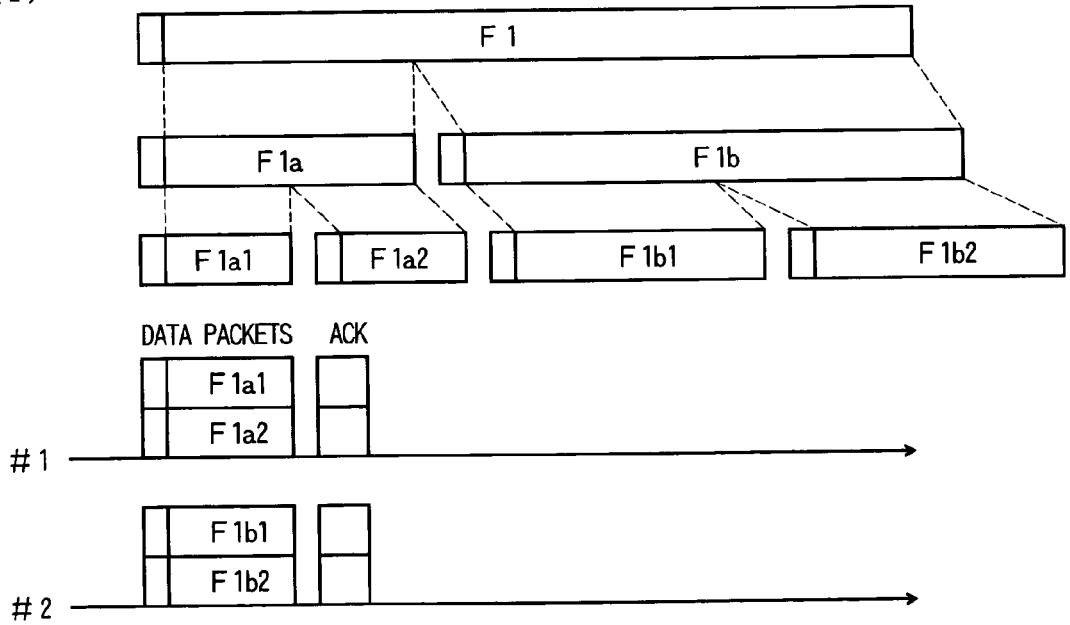
(2)

FIG. 11
DATA FRAME ON TRANSMISSION BUFFER
(1)
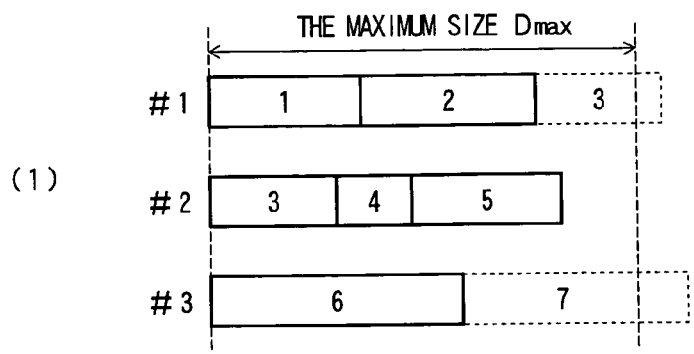
(2)
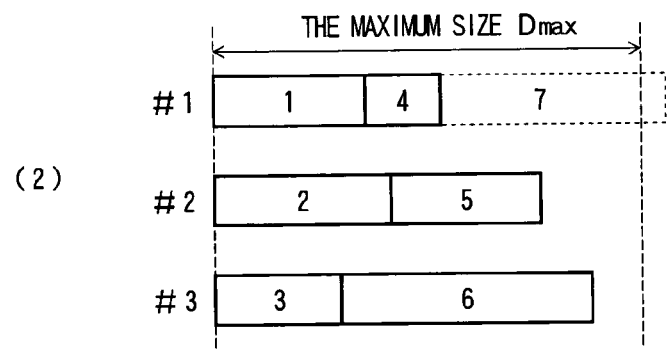
(3)
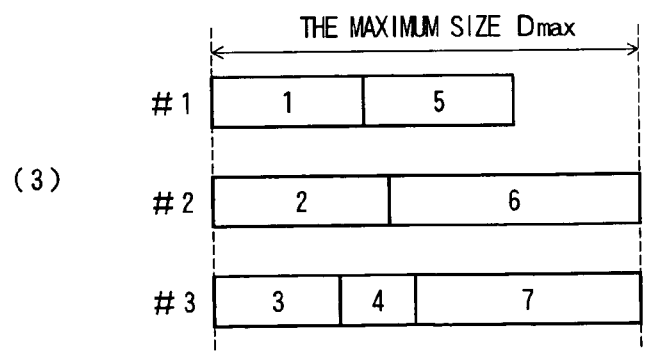

WIRELESS PACKET COMMUNICATION METHOD

CROSS-REFERENCE TO RELATED APPLICATION

This application is based upon and claims the benefit of priority from Japanese Patent Application Nos. 2003-173914 and 2003-173953, both filed on Jun. 18, 2003, Nos. 2003-177096 and 2003-177097, both filed on Jun. 20, 2003, No. 2003-207699, filed on Aug. 18, 2003, No. 2003-349223, filed on Oct. 8, 2003, No. 2004-017247, filed on Jan. 26, 2004 and No. 2004-158078, filed on May 27, 2004, the entire contents of which are incorporated herein by reference.

TECHNICAL FIELD

The present invention relates to a wireless packet communication method for transmitting a plurality of data packets simultaneously between two wireless stations (hereinafter STAs) using a plurality of radio channels and Multiple Input Multiple Output (hereinafter MINO). More particularly, the present invention relates to a wireless packet communication method for generation of a plurality of data packets to be transmitted simultaneously.

BACKGROUND ART

In a conventional wireless packet communication method, a radio channel to be used is determined in advance. Prior to transmission of data packets, carrier sense is performed to detect whether or not that radio channel is idle. Only when that radio channel is idle, one data packet is transmitted. This management process enables a plurality of STAs to share one radio channel in a staggered manner ((1) International Standard ISO/IEC 8802-11 ANSI/EEE Std. 802.11, 1999 edition, Information technology—Telecommunications and information exchange between systems—local and metropolitan area networks—Specific requirements—part 11: Wireless LAN Medium Access Control (MAC) and Physical Layer (PHY) specifications; (2) "Low-powered Data Communication System/Broadband Mobile Access Communication System (CSMA) Standard, ARIB STD-T71 version 1.0, Association of Radio Industries and Businesses, settled in 2000).

In order to improve a maximum throughput of the above wireless packet communication method, a method is known which broadens the frequency band per radio channel so as to increase the data transmission rate in the PHY layer.

However, it is necessary to provide a transmission deferral duration of a predetermined length that is independent of the data transmission rate in the PHY layer immediately after the transmission of a packet in order to avoid collision of packets, as pointed out, for example, in an article (Iizuka et al., "5 GHz Wireless LAN System Based on the IEEE802.11a standard—Packet Transmission Characteristics—", B-5-124, Proceedings of the Electronics Information and Communication Engineers, Society Conference 2000, September 2000). When such a transmission deferral duration is provided, the transmission efficiency of data packets (a ratio of the maximum throughput to the data transmission rate in the PHY layer) decreases with the increase in the data transmission rate in the PHY layer. Thus, it is difficult to significantly improve the throughput by only increasing the data transmission rate in the PHY layer.

On the other hand, the application of a MIMO technique (Kurosaki et al., "100 Mbit/s SDM-COFDM over MIMO Channel for Broadband Mobile Communications", Technical Reports of the Institute of Electronics, Information and Communication Engineers, A•P 2001-96, RCS2001-135(2001-10)) has been considered for improving the maximum throughput without broadening the frequency band per radio channel. In the MIMO technique, different data packets are transmitted from a plurality of antennas on the same radio channel at the same time. The data packets transmitted at the same time on the same radio channel are received by digital signal processing that can deal with the difference in propagation coefficients of the respective data packets received by a plurality of wireless antennas in an opposed STA. A MIMO number is determined in accordance with the propagation coefficients and the like.

On the other hand, in the case where each STA has a plurality of wireless network interfaces and can use a plurality of radio channels, different radio channels can be used between a plurality of STAs. In this case, improvement of the throughput is promising, as compared with communication performed by time-dividing one radio channel.

However, when the center frequencies of a plurality of radio channels used at the same time are close to each other, the effect of leakage power, which leaks from one radio channel to a frequency band used by another radio channel, becomes large. In general, in the case of transmitting a data packet, after a transmit-side STA sends a data packet, a receive-side STA sends back an acknowledge packet (ACK packet, NACK packet) for the received data packet to the transmit-side STA. When the transmit-side STA tries to receive that acknowledge packet, the effect of leakage power from another radio channel that carries out transmission at the same time becomes a problem.

For example, the case is considered where the center frequencies of radio channels #1 and #2 are close to each other and the transmission time is different between data packets that are transmitted simultaneously from the radio channels #1 and #2, as shown in FIG. 28. In the shown example, the data packet transmitted from the radio channel #1 is shorter. Thus, when an ACK packet for that data packet is received, the data packet on the radio channel #2 is still in transit. Therefore, the radio channel #1 may not receive the ACK packet because of leakage power from the radio channel #2. In this situation, the throughput cannot be improved even if transmission is carried out by using a plurality of radio channels at the same time.

If transmission rates of the respective radio channels are the same, the above situation occurs because of a difference in packet time length (transmission time=data size) between data packets. Considering the transmission rates of the respective radio channels, the above situation occurs because of the difference in packet time length (transmission time=data size/transmission rate) between data packets.

In a wireless LAN system or the like, the data size of a data frame input from a network is not constant. Thus, in the case where input data frames are sequentially converted into data packets and are transmitted, the packet time length (transmission time) of each data packet also changes. Therefore, even when a plurality of data packets are transmitted at the same time, as shown in FIG. 28, it is highly likely that a packet time length difference occurs between the data packets and causes a failure in the receiving of the ACK packet.

Moreover, in a wireless LAN system operating in accordance with IEEE802.11 Standard, for example, a data frame input from a wired network (e.g., Ethernet (registered trademark) frame) is converted into a MAC (Media Access Control) frame and a data packet generated from that MAC frame is transmitted as a wireless packet to a wireless line.

In a conventional system, one data frame is converted into one MAC frame from which one data packet is generated. Therefore, even if the data size of a data field in a data frame is small, that data frame is converted into one MAC frame and is transmitted as one data packet (wireless packet). For example, the maximum size of the data field of a MAC frame in accordance with IEEE802.11 Standard is 2296 bytes, whereas the data size of the data field of an Ethernet (registered trademark) frame that is typically used as a data frame is limited to 1500 bytes. Therefore, even if the Ethernet (trademark) frame has the maximum size, that Ethernet frame has some leftover in the maximum size (2296 bytes) of the data field of the MAC frame. That is, the conventional system does not effectively use the maximum data size that can be transmitted in one MAC frame, and has a limitation in the improvement of the throughput.

As described above, in order to further improve the throughput, it is necessary to overcome the problem of different packet time lengths in the case of simultaneous transmission using a plurality of radio channels (i.e., different data sizes when the transmission rates of the radio channels are the same) and the problem of inefficiency in the case where the data size of a data frame is smaller than the maximum size of a data field of a MAC frame.

FIG. 29 shows an exemplary configuration of a wireless LAN system. In FIG. 29, a mobile terminal (address: S1) 11, a server (address: S2) 12, and a server (address: S3) 13 are connected through an access point (hereinafter AP) (address: AP) 10. The mobile terminal 11 and the AP 10 are connected to each other through a wireless line on which wireless packets are transmitted. The AP 10 and the servers 12 and 13 are connected through a router and the Internet. Ethernet (registered trademark) frames are transmitted between them. In this example, a transmission direction from the servers 12 and 13 to the mobile terminal 11 is called as a "downlink", and a transmission direction from the mobile terminal 11 to the servers 12 and 13 is called as an "uplink".

FIG. 30 shows a frame format for the downlink of the wireless LAN system. In FIG. 30, an Ethernet frame transmitted from the server 12 or 13 to the AP 10 contains a header, a frame body, and FCS. In the header of the Ethernet frame transmitted from the server 12 to the mobile terminal 11, a destination address DA and a source address SA are set to "S1" and "S2", respectively. The frame body accommodates an IP packet for which the destination address DA and the source address SA are set to "S1" and "S2", respectively.

The Ethernet frame transmitted from the server 12 or 13 is converted into a wireless packet in the AP 10 and is transmitted to the mobile terminal 11. The wireless packet contains a MAC header, a frame body, FCS, and the like. In the MAC header of the wireless packet corresponding to the Ethernet frame transmitted from the server 12, "S1" is set as a destination address DA in a PHY layer, "AP" is set as BSS (Basic service set) ID corresponding to a source address in the PHY layer, and "S2" is set as a source address SA. The frame body accommodates an IP packet for which "S1" is set as the destination address DA and "S2" is set as the source address SA.

FIG. 31 shows a frame format for the uplink of the wireless LAN system. In FIG. 31, the mobile terminal 11 generates an IP packet to the server 12 or 13. In the IP header of the IP packet to the server 12, "S2" is set as a destination address DA and "S1" is set as a source address SA. A wireless packet transmitted from the mobile terminal 11 to the AP 10 contains a MAC header, a frame body, FCS, and the like. In the MAC header of the wireless packet accommodating the IP packet to the server 12, BSSID corresponding to a destination address in the PHY layer is set to "AP", a source address SA in the PHY layer is set to "S1", and a destination address DA is set to "S2". The frame body accommodates the IP packet for which the destination address DA is set to "S2" and the source address SA is set to "S1".

The wireless packet transmitted from the mobile terminal 11 is converted into an Ethernet frame in the AP 10 and is transmitted to the server 12 or 13. The Ethernet frame contains a header, a frame body, and FCS. In the header of the Ethernet frame to the server 12, a destination address DA and a source address SA are set to "S2" and "S1", respectively. The frame body accommodates the IP packet for which the destination address DA and the source address SA are set to "S2" and "S1", respectively.

A conventional AP generates one wireless packet from one Ethernet frame to the mobile terminal and transmits that wireless packet on the downlink of the PHY layer from the AP to the mobile terminal. From a viewpoint of improving transmission efficiency, a method is considered to be effective that generates one or more wireless packets from a plurality of Ethernet frames transmitted from a plurality of servers to the same mobile terminal and then transmits those one or more wireless packets in one lump.

Similarly, a conventional mobile terminal generates one wireless packet from one IP packet to a server and transmits that wireless packet on the uplink of the PHY layer from the mobile terminal to the AP. From a viewpoint of improving transmission efficiency, a method is considered to be effective that generates one or more wireless packets from a plurality of IP packets to the same server and transmits those one or more wireless packets in one lump.

Moreover, for the uplink of the PHY layer from the mobile terminal to the AP, another method can be considered, in which one or more wireless packets are generated from not only IP packets to the same servers but also IP packets that are transmitted to different servers through the same AP, and are transmitted in one lump. In the mobile terminal, IP packets to the same server can be found by referring to their destination addresses DA. It is also possible to find whether or not a plurality of IP packets to different servers go through the same AP by checking their destination addresses DA against the AP address.

It is an object of the present invention to provide a wireless packet communication method that can easily generate a plurality of data packets having the same packet time length in the case of transmitting a plurality of data packets simultaneously between two STAs by using a plurality of radio channel at the same time. It is another object of the present invention to provide a wireless packet communication method that can generate a plurality of data packets from one Ethernet frame or IP packet or from a plurality of Ethernet frames or IP packets to the same destination for each of a downlink and an uplink in a PHY layer between a mobile terminal and an access point (hereinafter AP) or between STAs.

DISCLOSURE OF THE INVENTION

According to a first aspect of the invention, a wireless packet communication method for transmitting X data packets simultaneously between two STAs by using a plurality of radio channels that are determined to be idle by carrier sense or using a radio channel that is determined to be idle and MIMO, or for transmitting X data packets simultaneously between two STAs by using both the above transmission methods where X corresponds to a total number of MIMOs of the plurality of radio channels is provided. When transmission rates of respective transmission media for transmitting the X data packets simultaneously are the same and a maximum data size of the data packets is Dmax, the wireless packet communication method is for fragmenting a data part extracted from a data field of one data frame to be transmitted to generate X data blocks that have data fields equal to or smaller than Dmax and the same packet time length (data size, transmission time), generates X data packets by adding a header field containing control information such as destination information and an FCS field containing an error checking code to each of the X data blocks, and transmits the X data packets simultaneously.

According to a second aspect of the invention, when it is possible to independently set transmission rates of transmission media for transmitting the X data packets simultaneously and a largest one of the transmission rates of the transmission media is a reference transmission rate, a maximum data size of the X data packets is set to a value obtained by (Dmax×a transmission rate of a corresponding line/a reference transmission rate); a data part extracted from a data field of one data frame to be transmitted is fragmented in accordance with transmission rates of respective lines to generate X data blocks having data fields equal to or smaller than the maximum data size of each line and having the same packet time length (transmission time); and X data packets are generated by adding a header field containing control information such as destination information and an FCS field containing an error checking code to each of the X data blocks, and are transmitted simultaneously.

In the first and second aspects of the invention, (a frame fragmentation method), a plurality of data packets that are equal to or smaller than the maximum data size and have the same packet time length can be generated from one data frame, and can be transmitted simultaneously by using a plurality of radio channels, or one radio channel and MIMO, or a plurality of radio channels and MIMO.

According to a third aspect of the invention, when transmission rates of transmission media for transmitting X data packets simultaneously are the same and a maximum data size of the X data packets is Dmax, X data blocks having data fields equal to or smaller than Dmax and a same packet time length (data size, transmission time) are generated by connecting and dividing data parts extracted from data fields of a plurality of data frames to be transmitted; and X data packets are generated by adding a main header field containing control information such as destination information and an FCS field containing an error checking code to each of the X data blocks, and are transmitted simultaneously.

According to a fourth aspect of the invention, when it is possible to independently set transmission rates of respective transmission media for transmitting X data packets simultaneously and a largest one of the transmission rates of the transmission media is a reference transmission rate, a maximum data size of the X data packets is set to a value obtained by (Dmax×a transmission rate of a corresponding line/the reference transmission rate); X data blocks having data fields equal to or smaller than the maximum data size in each line and the same packet time length (transmission time) are generated by connecting data parts extracted from data fields of a plurality of data frames to be transmitted and dividing the connected data parts in accordance with transmission rates of respective lines; and X data packets are generated by adding a main header field containing control information such as destination information and an FCS field containing an error checking code to each of the X data blocks, and are transmitted simultaneously.

In the third and fourth aspects of the invention, (a frame patching method), a plurality of data packets that are equal to or smaller than the maximum data size and have the same packet time length can be generated by connecting and dividing (cutting and pasting) a plurality of data frames, and can be transmitted simultaneously by using a plurality of radio channels, or one radio channel and MIMO, or a plurality of radio channels and MIMO.

According to a fifth aspect of the invention, when transmission rates of transmission media for transmitting X data packets simultaneously are the same and a maximum data size of the X data packets is Dmax, X data series having data fields equal to or smaller than Dmax are generated by aggregating data parts extracted from data fields of a plurality of data frames to be transmitted; X data blocks having the same packet time length (data size, transmission time) are generated by adding dummy data to a data series of the X data series except one having a largest data size; and X data packets are generated by adding a header field containing control information such as destination information and an FCS field containing an error checking code to each of the X data blocks, and are transmitted simultaneously.

According to a sixth aspect of the invention, when it is possible to independently set transmission rates of respective transmission media for transmitting X data packets simultaneously and a largest one of the transmission rates of the transmission media is a reference transmission rate, a maximum data size of the X data packets is set to a value obtained by (Dmax×a transmission rate of a corresponding line/the reference transmission rate); X series having data fields equal to or smaller than the maximum data size in each line are generated by aggregating data parts extracted from data fields of a plurality of data frame to be transmitted; X data blocks having the same packet time length (transmission time) are generated by adding dummy data to a data series the X data series except one having a largest packet time length (transmission time); and X data packets are generated by adding a header field containing control information such as destination information and an FCS field containing an error checking code to each of the X data blocks, and are transmitted simultaneously.

In the fifth and sixth aspects of the invention, (a frame aggregation method), a plurality of data packets that are equal to or smaller than the maximum data size and have the same packet time length can be generated by aggregating a plurality of data frames so as not to exceed the maximum data size, and can be transmitted simultaneously by using a plurality of radio channels, or one radio channel and MIMO, or a plurality of radio channels and MIMO.

According a seventh aspect of the invention, in the case where it is possible to independently set the transmission rates of the transmission media for transmitting the X data packets simultaneously in any one of the first, third and fifth aspects of the invention, the transmission rates of the transmission media are made the same as a smallest one of the transmission rates.

According to an eight aspect of the invention, in the fifth aspect of the invention, the data series are generated by accepting the data frames to be transmitted in order and assigning the data frames to the respective transmission media until a total data size reaches a largest size not exceeding the maximum data size Dmax.

According to a ninth aspect of the invention, in the fifth aspect of the invention, the data series are generated by accepting the data frames to be transmitted in order, assigning one data frame to each of the transmission media, and repeating the assignment of one data frame until a total data size reaches a largest size that is equal to or smaller than the maximum data size Dmax.

According to a tenth aspect of the invention, in the fifth aspect of the invention, the data series are generated by accepting the data frames to be transmitted in order, assigning one data frame to each of the transmission media, and repeating the assignment of one data frame such that a next data frame is assigned to one of the transmission media that has a smallest data size of assigned data frames until a total data size reaches a largest size that is equal to or smaller than the maximum data size Dmax.

According to an eleventh aspect of the invention, in the fifth aspect of the invention, the data series are generated by employing one of the methods according to the eighth to tenth aspects of the invention so that a total number of accommodated data frames is to be a maximum.

According to a twelfth aspect of the invention, in the sixth aspect of the invention, the data series are generated by accepting the data frames to be transmitted in order and assigning the data frames to the respective transmission media until a total data size reaches a maximum value equal to or smaller than the maximum data size.

According to a thirteenth aspect of the invention, in the sixth aspect of the invention, the data series are generated by accepting the data frames to be transmitted in order, assigning one data frame to each of the transmission media, and repeating the assignment of one data frame until a total data size reaches a largest size that is equal to or smaller than the maximum data size.

According to a fourteenth aspect of the invention, in the sixth aspect of the invention, the data series are generated by accepting the data frames to be transmitted in order, assigning one of the data frames to one of the transmission media, repeating the assignment of one data frame such that a next data frame is assigned to one of the transmission media that has a smallest data size of assigned data frames until a total data size reaches a largest size that is equal to or smaller than the maximum data size.

According to a fifteenth aspect of the invention, in the sixth aspect of the invention, the data series are generated by employing one of the methods according to the twelfth to fourteenth aspects of the invention so that a total number of accommodated data frames is to be a maximum.

According to a sixteenth aspect of the invention, in the fifth or sixth aspect of the invention, the data series are generated to contain sub-headers for identifying the data frames, respectively.

According to the a seventeenth aspect of the invention, when transmission rates of transmission media for transmitting X data packets simultaneously are the same and a maximum data size of the data packets is Dmax, the X data packets are generated by the method according to the first aspect of the invention in the case where a number of data frames to be transmitted is 1; the X data packets are generated by the method according to the third or fifth aspect of the invention, in the case where the number of the data frames to be transmitted is 2 or more and it is possible to generate data packets equal to or smaller than a maximum data size in each line by the connection and division according to the third aspect of the invention or the aggregation according to the fifth aspect of the invention; and the X data packets are generated by the method according to the first aspect of the invention, in the case where the number of the data frames to be transmitted is 2 or more and it is impossible to generate the data packets equal to or smaller than the maximum data size in each line by the connection and division according to the third aspect of the invention or aggregation according to the fifth aspect of the invention.

According to an eighteenth aspect of the invention, when it is possible to independently set transmission rates of transmission media for transmitting X data packets simultaneously and a largest one of the transmission rates of the transmission media is a reference transmission rate, a maximum data size of the X data packets is set to a value obtained by (Dmax×a transmission rate of a corresponding line/the reference transmission rate); the X data packets are generated by the method according to the second aspect of the invention in the case where a number of data frames to be transmitted is 1; the X data packets are generated by the method according to the fourth or sixth aspects of the invention, in the case where the number of the data frames to be transmitted is 2 or more and it is possible to generate data packets equal to or smaller than a maximum data size in each line by the connection and division according to the fourth aspect of the invention or the aggregation according to the sixth aspect of the invention; and the X data packets are generated by the method according to the second aspect of the invention, in the case where the number of the data frames to be transmitted is 2 or more and it is impossible to generate the data packets equal to or smaller than the maximum data size in each line by the division and connection according to the fourth aspect of the invention or aggregation according to the sixth aspect of the invention.

According to a nineteenth aspect of the invention, in the first or second aspect of the invention, X data packets that are generated after simultaneous transmission of the X data packets are transmitted continuously without performing carrier sense, until a time corresponding to a transmission time of data packets generated from one data frame before being fragmented passes.

According to a twentieth aspect of the invention, in the first or second aspect of the invention, X data packets that are generated after simultaneous transmission of the X data packets are transmitted simultaneously consecutively X times without performing carrier sense.

According to a twenty-first aspect of the invention, in any one of the first to sixth aspects of the invention, when one of the two STAs is an AP and the other is a mobile terminal, one or more data frames are selected from data frames addressed to a same mobile terminal in a transmission buffer of the AP within a range in which the one or more data frames are able to be accommodated in data packets to be transmitted simultaneously, the transmission buffer storing data frames transmitted to the mobile terminal from a device connected to the AP; a source address of the device connected to the AP is added to each of frame bodies of the one or more data frames and the frame bodies are connected; the X data packets are generated by adding a MAC header to each of data blocks obtained by dividing the connected frame bodies by a number of simultaneous transmissions, and are transmitted simultaneously.

According to a twenty-second aspect of the invention, in any one of the first to sixth aspects of the invention, when one of the two STAs is an AP and the other is a mobile terminal, one or more IP packets are selected from IP packets addressed to a same AP in a transmission buffer of the mobile terminal within a range in which the one or more IP packets are able to be accommodated in data packets to be transmitted simultaneously, the transmission buffer being storing IP packets to be transmitted to a device connected to the AP; a destination address of the device connected to the AP is added to each of the one or more IP packets and the one or more IP packets are connected; and the X data packets are generated by adding a MAC header to each of data blocks obtained by dividing the connected frame bodies by a number of simultaneous transmissions, and are transmitted simultaneously.

According to a twenty-third aspect of the invention, in any one of the first to sixth aspects of the invention, when one of the two STAs is an AP and the other is a mobile terminal, one or more data frames are selected and aggregated from data frames addressed to a same mobile terminal in a transmission buffer of the AP within a range in which the one or more data frames are able to be accommodated in data packets to be transmitted simultaneously, the transmission buffer storing data frames transmitted to the mobile terminal from a device connected to the AP; a source address of the device connected to the AP is added to each of frame bodies of the selected data frames; a MAC header is further added to each of the frame bodies of the selected data frames to generate the X data packets; and the X data packets are transmitted simultaneously.

According to a twenty-fourth aspect of the invention, in any one of the first to sixth aspects of the invention, when one of the two STAs is an AP and the other is a mobile terminal, one or more IP packets are selected and aggregated from IP packets addressed to a same AP in a transmission buffer of the mobile terminal within a range in which the selected IP packets are able to be accommodated in data packets to be transmitted simultaneously, the transmission buffer storing IP packets to be transmitted to a device connected to the AP; a destination address of the device connected to the AP is added to each of the selected IP packets; a MAC header is further added to each of the selected IP packets to generate the X data packets; and the X data packets are transmitted simultaneously.

According to a twenty-fifth aspect of the invention, in any one of the first to sixth aspects of the invention, when one of the two STAs transfers data frames accumulated in a transmission buffer to the other STA, the one STA generates data packets by the method according to any one of the twenty-first to twenty-fourth aspects of the invention and transmits the data packets in one lump or simultaneously, for data frames addressed to the other STA.

According to a twenty-sixth aspect of the invention, in any one of the first to sixth aspects of the invention, a communication device is connected to each of the two STAs. When one of the two STAs transfers data frames that are accumulated in a transmission buffer and are transmitted from a source device connected to the one STA to a destination device connected to the other STA, the one STA generates data packets by the method recited in any one of claims 28 to 33 and transmits the data packets in one lump or simultaneously, for data frames addressed to the other STA.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 5 is a time chart of an exemplary operation in the third embodiment of the present invention;

FIG. 11 is a diagram showing examples of aggregation of data frames as exemplary operations in the sixth embodiment of the present invention;

BEST MODE FOR CARRYING OUT THE INVENTION

Embodiment 1

Figure 1:
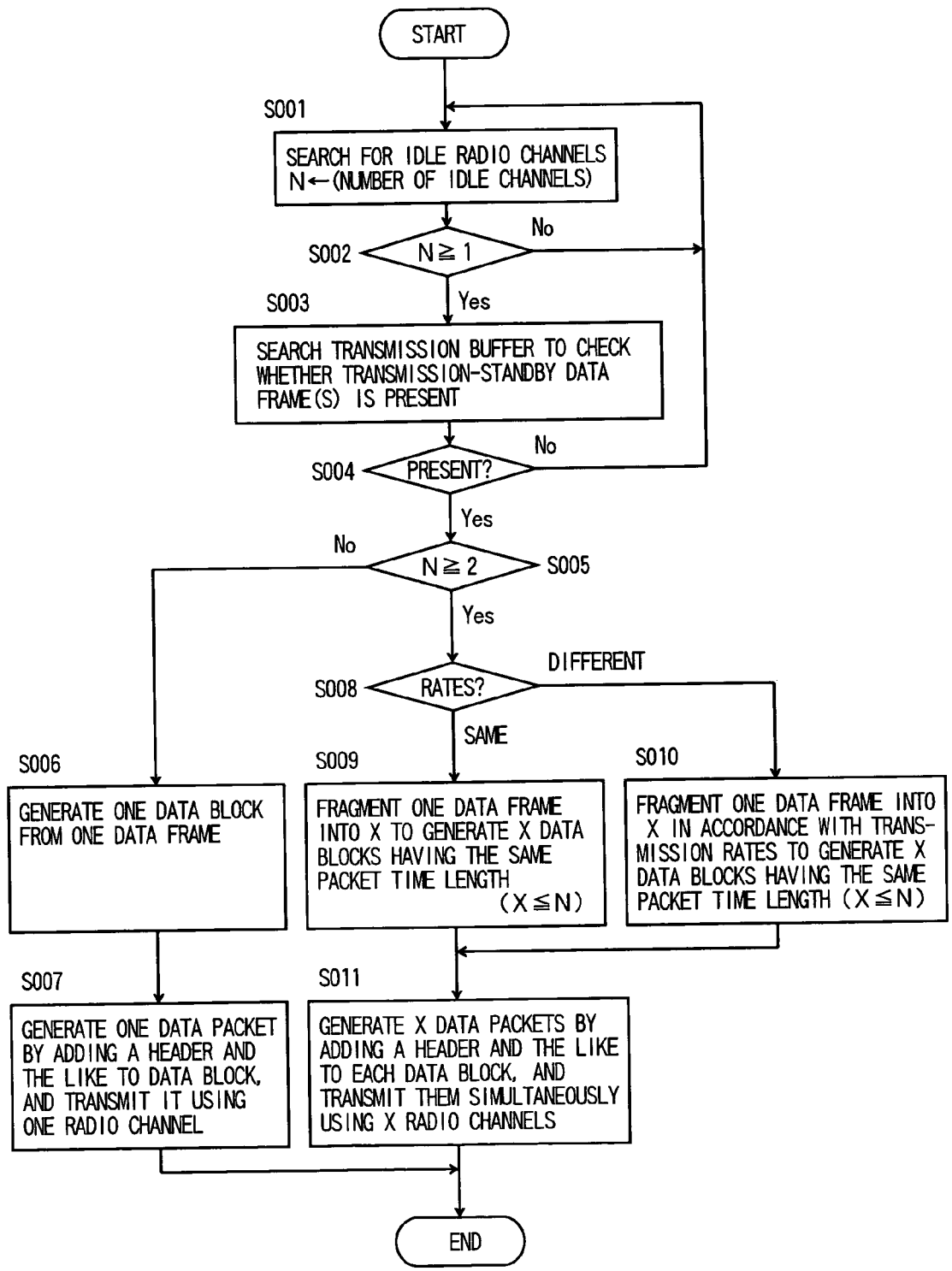
FIG. 1 is a flowchart of a procedure according to a first embodiment of the present invention.
Figure 2:
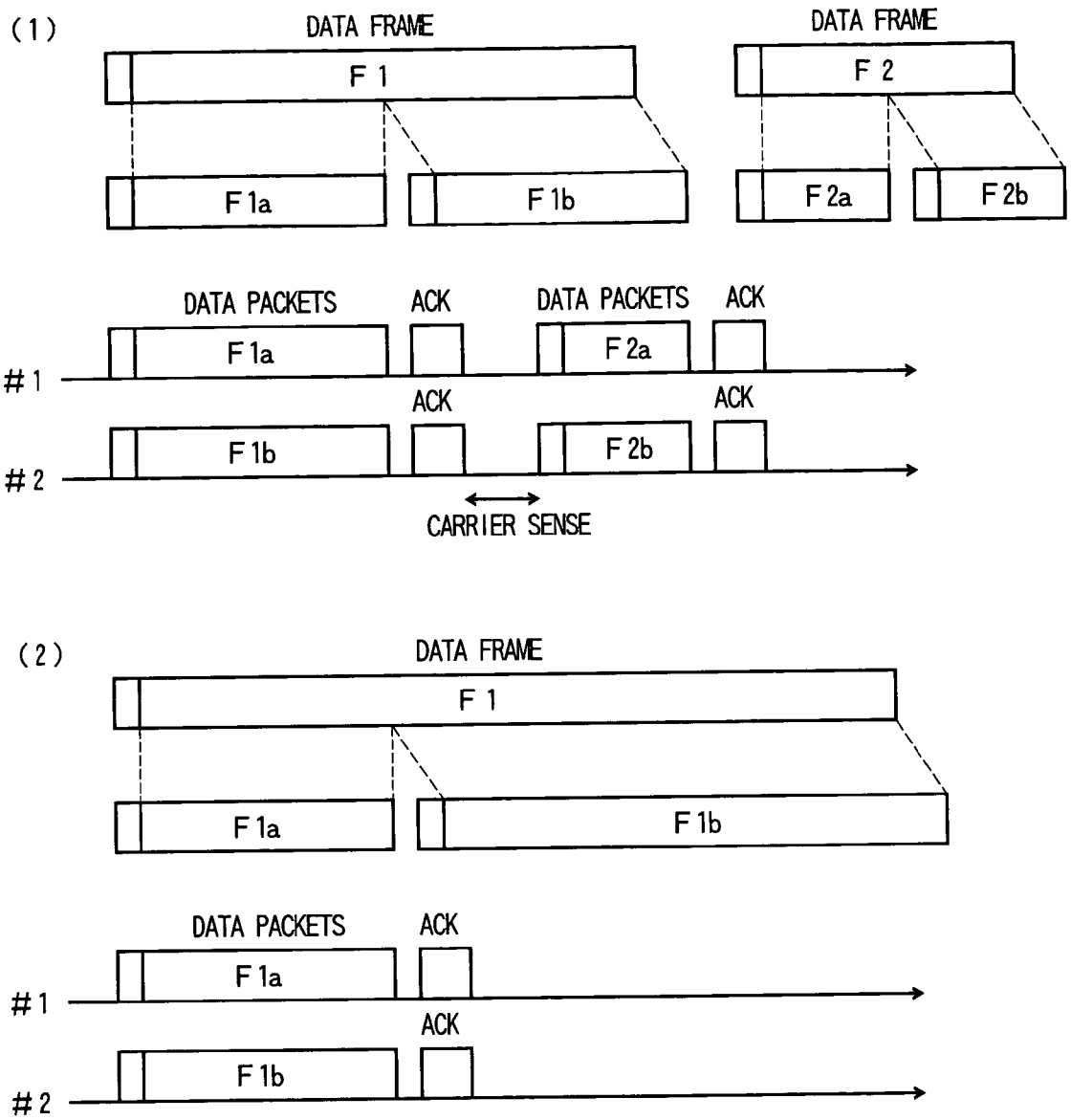
FIG. 2 is a time chart of an exemplary operation in the first embodiment of the present invention.

FIG. 1 is a flowchart according to a first embodiment of the present invention. FIG. 2 shows an exemplary operation in the first embodiment of the present invention. Please note that a transmission-standby data frame in a transmission buffer in the following description is a data frame transmitted between two STAs.

An idle radio channel is searched from all available radio channels by carrier sense (S001). The number of the detected idle channels is assumed to be N. In the case where one or more idle radio channels are detected, it is searched whether or not there is a transmission-standby data frame in a transmission buffer (S002 and S003). When there is no transmission-standby data frame, the procedure goes back to the carrier sense. When there is any transmission-standby data frame, the procedure goes ahead (S004). In the case where N=1, one data block is generated from one data frame (S005 and S006). A header field containing control information such as destination information and an FCS (Frame Check Sequence) part containing an error checking code (hereinafter, referred to as "a header and the like") are added to the thus generated data block, thereby generating a data packet. The data packet is transmitted by using one radio channel (S007).

A transmission rate of each radio channel may be fixed in advance, or may be set on a case-by-case basis by selecting one of a plurality of transmission rates determined in advance, based on the quality of a wireless line.

In the case where N≧2, the transmission rates of the respective radio channels are checked (S008). At this time, the number X of data packets that are to be transmitted simultaneously is determined (X≦N). When the transmission rates of the respective radio channels are the same, a data part of one data frame is fragmented into X so as to generate X data blocks having the same packet time length (S009). When two radio channels are idle, for example, two data packets can be transmitted at the same time. Thus, as shown in FIG. 2(1), the data part of one data frame is equally fragmented so as to generate two data blocks.

On the other hand, when the transmission rates of the respective radio channels are different, the data part of one data frame is fragmented into X at a size ratio corresponding to the transmission rates, so as to generate X data blocks having the same packet time length (transmission time) (S010). For example, when two radio channels (#1 and #2) are idle and their transmission rates are 6 Mbit/s and 12 Mbit/s, respectively, the data part of one data frame is fragmented at a packet size ratio of 1:2 so as to generate two data blocks, as shown in FIG. 2(2).

After the X data blocks are generated in Step S009 or S010, X data packets are generated by adding a header and the like to each of the X data blocks. The thus generated X data packets are transmitted simultaneously by using X radio channels (S011). The data packets transmitted simultaneously have the same packet time length, as shown in FIG. 2. Therefore, transmission of the X data packets terminates at the same time. Thus, ACK packets after that transmission can be received without being affected by leakage power.

If a plurality of data packets transmitted simultaneously have different packet time lengths, a termination time of transmission of each data packet is different by a time corresponding to a difference of the packet time length. Thus, a time at which each ACK packet is received is different by the time corresponding to the difference of the packet time length. However, when the difference of the packet time length between the data packets is sufficiently small and the difference of the transmission termination time between the data packets is shorter than a time until receiving of an ACK packet starts, each ACK packet can be received without being affected by leakage power. In other words, it is not always necessary that the packet time lengths of the data packets to be transmitted simultaneously are strictly the same. The phrase "having the same packet time length" in the claims is written considering the above.

Embodiment 2

Figure 3:
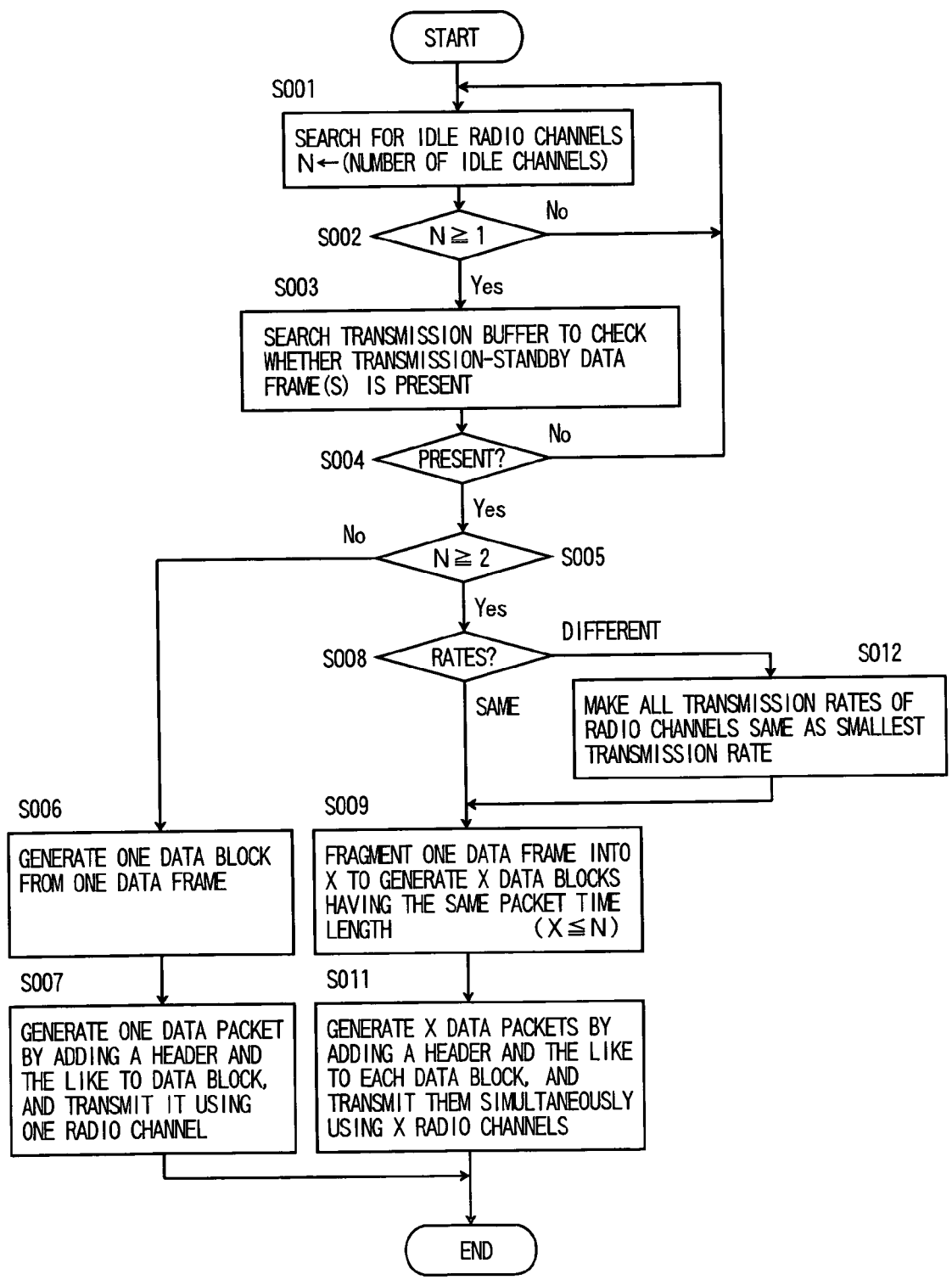
FIG. 3 is a flowchart of a procedure according to a second embodiment of the present invention.

FIG. 3 is a flowchart according to a second embodiment of the present invention.

In the present embodiment, when the transmission rates of the idle radio channels are different in the first embodiment, a smallest one of the transmission rates is selected as a common transmission rate (S012). In this case, it is not necessary to perform the process in Step S010 of the first embodiment. One data frame is fragmented into X in Step S009 so as to generate X data blocks having the same packet time length.

Embodiment 3

Figure 4:
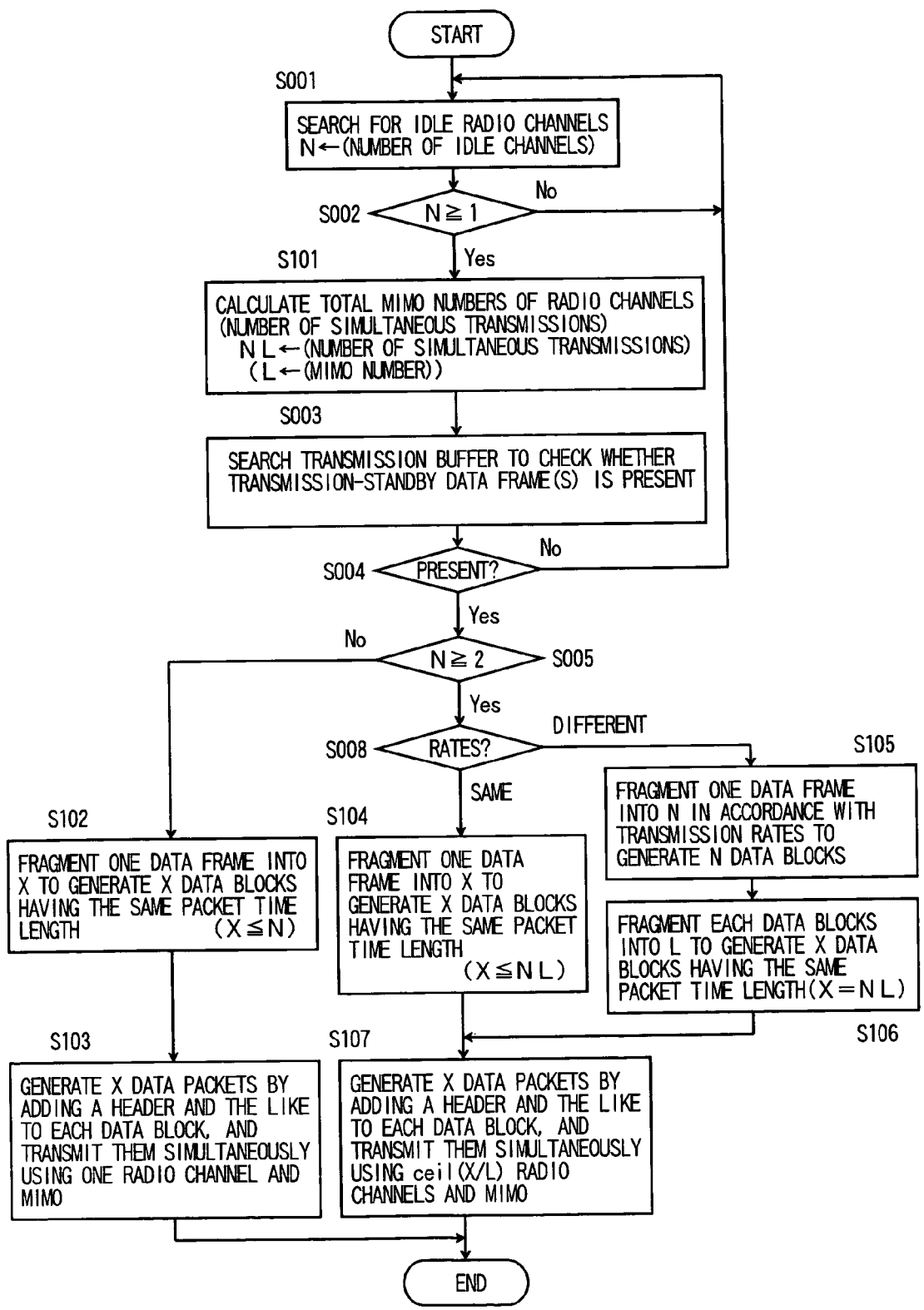
FIG. 4 is a flowchart of a procedure according to a third embodiment of the present invention.

FIG. 4 is a flowchart according to a third embodiment of the present invention. FIG. 5 shows an exemplary operation in the third embodiment of the present invention. It is assumed that radio channels #1 and #2 are provided between two STAs. A transmission stand-by data packet in a transmission buffer in the following description is a data packet to be transmitted between those two STAs.

A feature of the present embodiment is to use MIMO in the first embodiment. An idle radio channel is searched from all available radio channels by carrier sense (S001). The number of the detected idle channels is assumed to be N. In the case where one or more idle radio channels are detected, a total number of MIMOs is calculated as "a number of simultaneous transmissions" (S002 and S101). For simplification, it is assumed that the MIMO numbers of the respective radio channels are the same and the number of simultaneous transmissions is a product (NL) of the number N of the idle channels and the MIMO number L.

Next, it is searched whether or not there is a transmission-standby data frame in a transmission buffer (S003). When there is no transmission-standby data frame, the procedure goes back to carrier sense. When there is a transmission-standby data frame, the procedure goes ahead (S004). In the case where N=1, X data packets are generated by fragmenting one data frame into X and are then transmitted by using one radio channel and MIMO (S005, S102, and S103).

In the case where N≧2, transmission rates of the respective radio channels are checked (S008). The number X (X≦NL) of data packets to be transmitted simultaneously is also determined. When the transmission rates of the respective radio channels are the same, a data part of one data frame is fragmented into X so as to generate X data blocks having the same packet time length (S104). For example, when two radio channels are idle and the MIMO number L of each radio channel is 2, four data packets can be transmitted at the same time. Therefore, the data part of one data frame is equally fragmented to generate four data blocks, as shown in FIG. 5(1).

On the other hand, when the transmission rates of the respective radio channels are different, the data part of one data frame is fragmented into N at a size ratio corresponding to the transmission rates, thereby generating N data blocks (S105). Then, each of the N data block is fragmented into L to generate X (=NL) data blocks having the same packet time length (transmission time) (S106). For example, when two radio channels (#1 and #2) are idle, transmission rates thereof are 6 Mbit/s and 12 Mbit/s, respectively, and the MIMO number L of each channel is 2, the data part of one data frame is fragmented at a packet size ratio of 1:2, and each of the resultant data blocks is equally fragmented, thereby generating four data blocks, as shown in FIG. 5(2). In the case where transmission rates of respective transmission media for MIMO are different, it is only necessary to perform fragmentation in accordance with the transmission rates in a similar manner.

After the X data blocks are generated in Step S104 or S106, X data packets are generated by adding a header and the like to each of the X data blocks. The X data packets are transmitted simultaneously by using ceil (X/L) radio channels and MIMO (S107), where ceil (x) represents the smallest integer equal to or larger than x (i.e., an integer obtained by rounding up x). The simultaneous transmission of the data packets terminates at the same time, because those data packets have the same packet time length, as shown in FIG. 5. Thus, ACK packets after that transmission can be received without being affected by leakage power.

Embodiment 4

Figure 6:
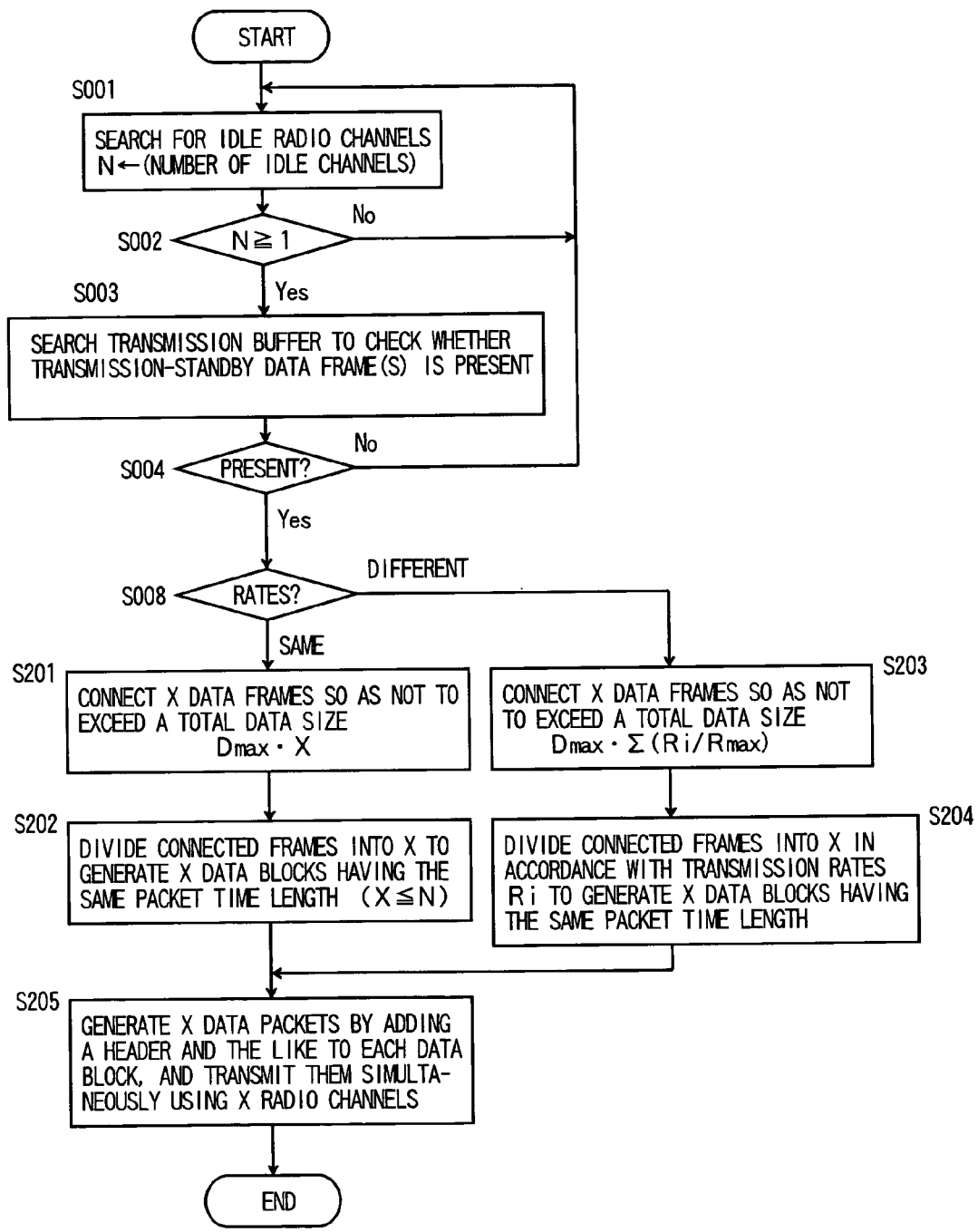
FIG. 6 is a flowchart of a procedure according to a fourth embodiment of the present invention.

FIG. 6 is a flowchart according to a fourth embodiment of the present invention.

Figure 7:
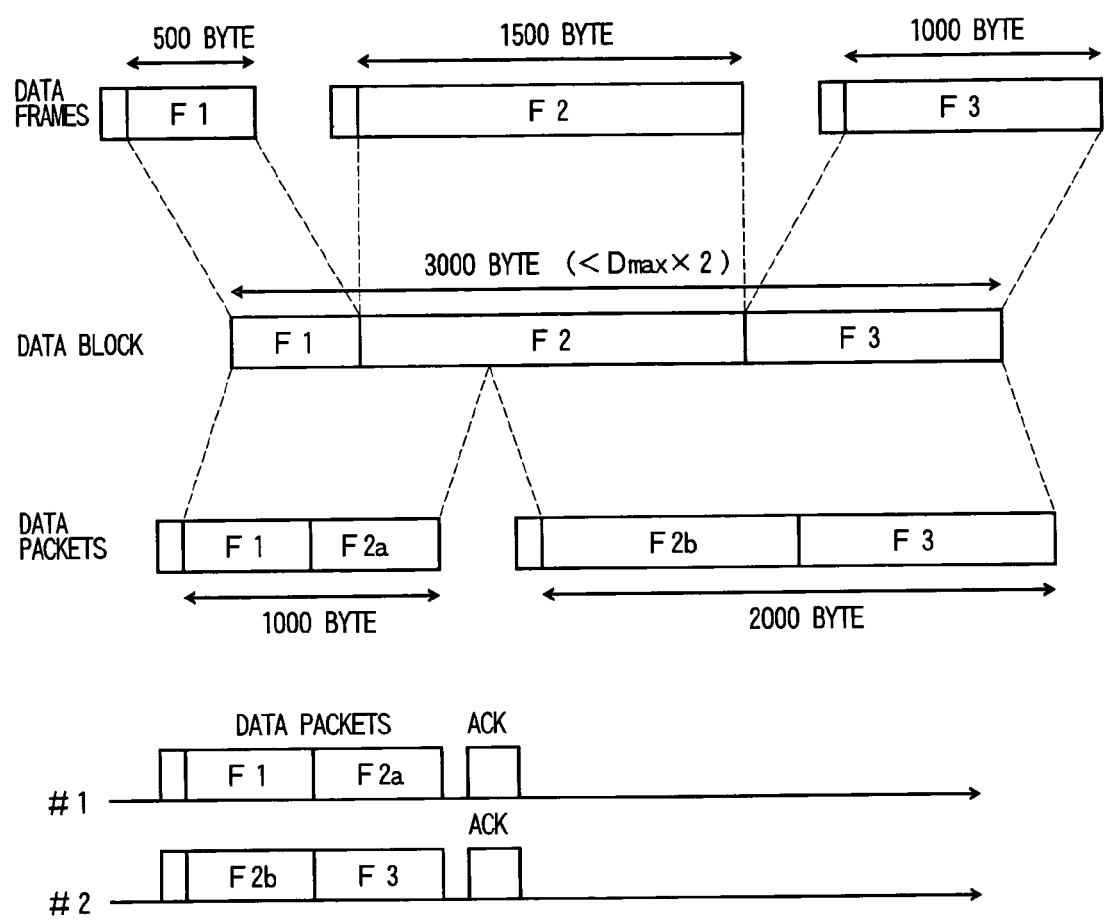
FIG. 7 is a time chart of an exemplary operation in the fourth embodiment of the present invention.

FIG. 7 shows an exemplary operation in the fourth embodiment of the present invention. In this example, it is assumed that radio channels #1 and #2 are provided between two radio channels. In the following description, a transmission standby data packet in a transmission buffer is a data packet transmitted between those two STAs.

An idle radio channel is searched from all available radio channels by carrier sense (S001). The number of the detected idle channels is assumed to be N. When one or more idle radio channels are detected, it is then searched whether or not there is a transmission-standby data frame in the transmission buffer (S002 and S003). When there is no transmission-standby data frame, the procedure goes back to carrier sense. When there is a transmission-standby data frame, the procedure goes ahead (S004).

First, the number X (X≦N) of radio channels to be used for simultaneous transmission is determined, and transmission rates of those radio channels are checked (S008). Although it is assumed that N≧2 in the following description, a similar description can be applied to the case where N=1 by setting X to 1. When the transmission rates of the respective radio channels are the same, the maximum size Dmax that can be transmitted in one MAC packet is determined, and a total of the maximum data size Dmax·X in the case where simultaneous transmission is performed using X radio channels is calculated. Then, data parts of transmission-standby data frames are connected so as not to exceed the above total of the maximum data size (S201). The connected data frames are divided into X so as to generate X data blocks having the same packet time length (S202).

On the other hand, when the transmission rates of the respective radio channels are different, the maximum size in each radio channel Dmax·Ri/Rmax is determined, assuming that a transmission rate of each radio channel is Ri (i is an integer from 1 to X), the maximum transmission rate is Rmax, and the maximum size of data that can be transmitted in one MAC packet is Dmax. In addition, the total of the maximum data size when simultaneous transmission is performed using X radio channels is calculated. Then, data parts of transmission-standby data frames are connected so as not to exceed the above total of the maximum data size (S203). The connected data frames are divided into X at a size ratio corresponding to the transmission rates Ri, thereby generating X data blocks having the same packet time length (transmission time) (S204). After the X data blocks are generated in Step S202 or S204, X data packets are generated by adding a header and the like to each data block. The X data packets are transmitted simultaneously using X radio channels (S205).

A process for generating two data packets from three data frames in the case where two radio channels have transmission rates of 12 Mbit/s and 24 Mbit/s, respectively, is now described with reference to FIG. 7. The three data frames contain a data part F1 of 500 bytes, a data part F2 of 1500 bytes, and a data part F3 of 1000 bytes, respectively. A data block of 3000 bytes is generated by connecting those data parts. Then, the thus generated data block is divided at a packet size ratio of 1:2, thereby generating a data block of 1000 bytes and a data block of 2000 bytes. A size ratio of data parts of two data packets generated from those two data blocks is 1:2, and is the same as a ratio of the transmission rates of the corresponding radio channels. Thus, the data packets require the same length of time for transmission, i.e., have the same packet time length. Therefore, ACK packets after the transmission of those data packets can be received without being affected by leakage power.

Embodiment 5

Figure 8:
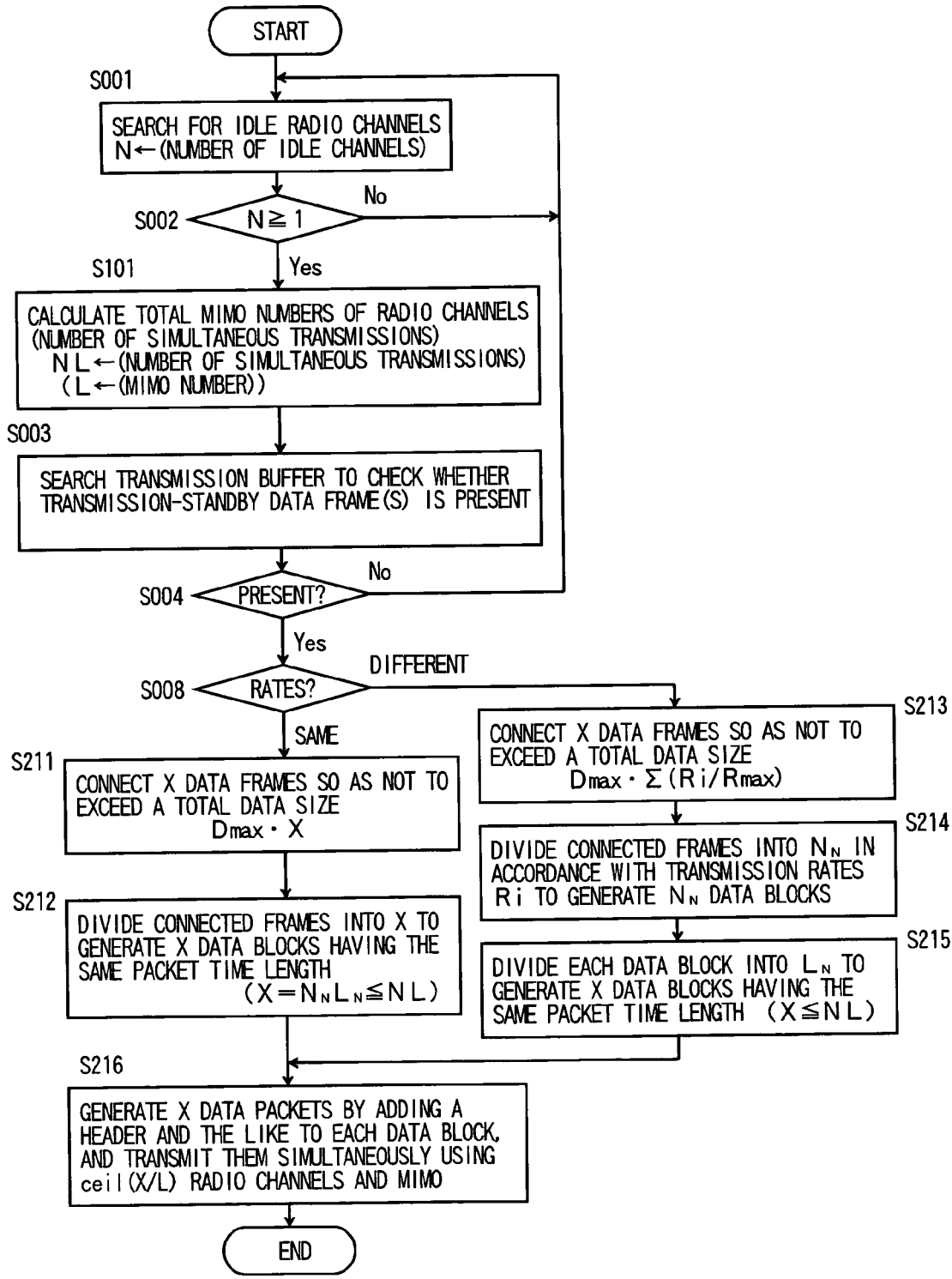
FIG. 8 is a flowchart of a procedure according to a fifth embodiment of the present invention.

FIG. 8 is a flowchart according to a fifth embodiment of the present invention.

A feature of the present invention is to use MIMO in the fourth embodiment. An idle radio channel is searched from all available channels by carrier sense (S001). The number of the detected idle channels is assumed to be N. In the case where one or more idle radio channels are detected, a total number of MIMOs of the respective radio channels is calculated as "a number of simultaneous transmissions" (S002 and S101). For simplification, the description is made assuming that the MIMO numbers of the respective radio channels are the same and the number of simultaneous transmissions is a product (NL) of the number N of idle channels and the MIMO number L.

Next, it is searched whether or not there is a transmission-standby data frame in a transmission buffer (S003). When no transmission-standby data frame is present, the procedure goes back to carrier sense. When there is a transmission-standby data frame, the procedure goes ahead (S004).

First, the number $N_N$ of radio channels to be used for simultaneous transmission, a MIMO number $L_N$ of each radio channel, and a number of simultaneous transmissions X that is the number of data packets to be transmitted simultaneously ($X=N_N L_N \leq NL$) are determined. In this step, transmission rates of the respective radio channels are also checked (S008). Although the following description is made assuming that $N_N L_N \geq 2$, it can be also applied to the case where $N_N L_N =1$ by setting X to 1. When the transmission rates of the respective radio channels are the same, the maximum size Dmax that can be transmitted in one MAC packet is determined, and a total of the maximum data size Dmax·X in the case where X data packets are transmitted simultaneously by using the radio channels and MIMO is calculated. Then, data parts of transmission stand-by data frames are connected so as not to exceed the above total of the maximum data size (S211). The connected data frames are divided into X, thereby generating X data blocks having the same packet time length (S212).

On the other hand, when the transmission rates of the respective radio channels are different, the maximum size Dmax·Ri/Rmax for each transmission medium is determined, where a transmission rate of each of transmission media formed by radio channels and MIMO is Ri (i is an integer from 1 to X), the maximum transmission rate is Rmax, and the maximum size that can be transmitted in one MAC packet is Dmax. Then, the total of the maximum data size in the case where X data packets are transmitted simultaneously by using radio channels and MIMO is calculated. Data parts of the transmission stand-by data frames are connected so as not to exceed the total of the maximum data size (S213). The connected data frames are divided into $N_N$ at a size ratio corresponding to the transmission rates Ri, thereby generating $N_N$ data blocks (S214). Next, each data block is divided into $L_N$ so as to generate X ($=N_N L_N \leq NL$) data blocks having the same packet time length (transmission time) (S215). If the transmission rates of the respective transmission media for MIMO are different, it is only necessary to perform division in accordance with the respective transmission rates in a similar manner.

After the X data blocks are generated in Step S212 or S215, X data packets are generated by adding a header and the like to each data block. The X data packets are transmitted simultaneously by using ceil (X/L) radio channels and MIMO (S216).

Embodiment 6

Figure 9:
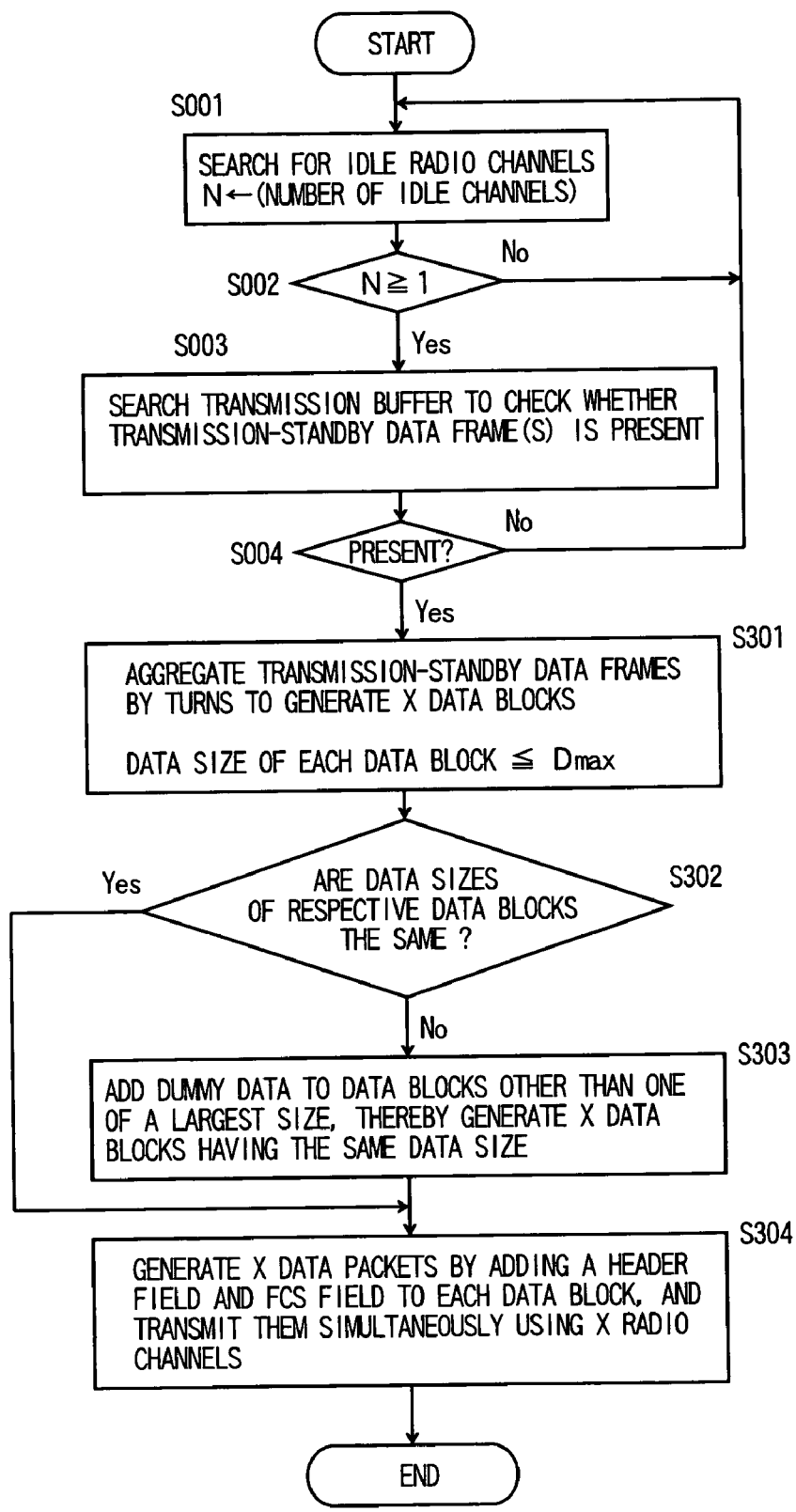
FIG. 9 is a flowchart of a procedure according to a sixth embodiment of the present invention.
Figure 10:
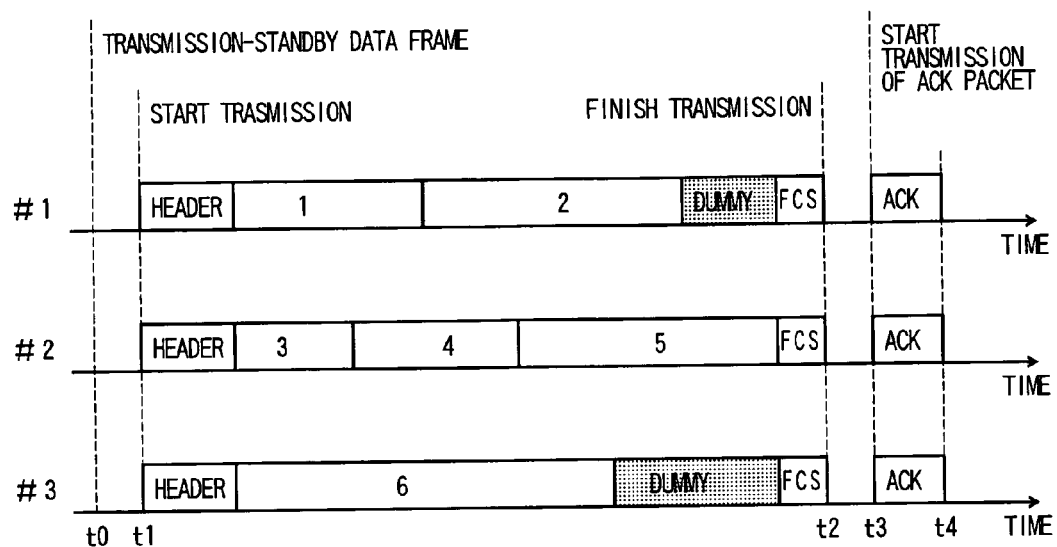
FIG. 10 is a time chart of an exemplary operation in the sixth embodiment of the present invention.

FIG. 9 is a flowchart according to a sixth embodiment of the present invention. FIGS. 10 and 11 show exemplary operations in the sixth embodiment of the present invention. In the shown example, radio channels #1, #2, and #3 are provided between two STAs. A transmission stand-by data packet in a transmission buffer in the following description is a data packet transmitted between those two STAs. It is assumed that transmission rates of the respective radio channels are set to be the same.

An idle radio channel is searched from all available radio channels by carrier sense (S001). The number of the detected idle channels is assumed to be N. When one or more idle radio channels are detected, it is then searched whether or not there is a transmission-standby data frame in the transmission buffer (S002 and S003). When there is no transmission-standby data frame, the procedure goes back to carrier sense. When there is a transmission-standby data frame, the procedure goes ahead (S004).

First, the number X (X≦N) of data packets to be transmitted simultaneously is determined. Although it is assumed that N≧2 in the following description, a similar description can be also applied to the case where N=1 by setting X to 1. Then, X data blocks are generated by aggregating transmission-standby data frames in order (S301). Please note that the data frames are aggregated in such a manner that the data size of each data block does not exceed the maximum data size Dmax that can be transmitted in one MAC frame (e.g., 2296 bytes). FIG. 10 shows an example in which data frames 1 and 2 are assigned to the radio channel #1, data frames 3, 4, and 5 are assigned to the radio channel #2, and a data frame 6 is assigned to the radio channel #3. An assignment and management method for forming those data blocks will be described later.

Next, the data sizes of the data blocks are compared with each other. When the data sizes are different, dummy data is added to each of data blocks other than a data block having the largest data size, thereby making the data sizes of all the data blocks the same (S302 and S303). In the example of FIG. 10, dummy data is added to the data blocks of the radio channels #1 and #3. Thus, the data sizes of the data blocks of the radio channels #1 and #3 are made the same as that of the radio channel #2. When the data sizes of the respective data blocks are the same, Step S303 for adding dummy data is omitted.

Next, X data packets are generated by adding a header and the like to each data block and are transmitted simultaneously by using X radio channels (S304). The data packets of the respective radio channels are transmitted at approximately the same time in a period from time t1 to time t2, and ACK packets can be received at approximately the same time in a period from time t3 to time t4, as shown in FIG. 10.

FIG. 11 shows a method for assigning and managing data frames. FIG. 11(1) shows a method in which data frames accumulated in the transmission buffer are assigned to the radio channels in order from the first one of the data frames until the total data size in each radio channel reaches the largest size that does not exceed the maximum data size Dmax, thereby generating data blocks. In the shown example, the data frames 1 and 2 are assigned to the radio channel #1, the data frames 3, 4, and 5 are assigned to the radio channel #2, and the data frame 6 is assigned to the radio channel #3. Please note that given correspondence between the radio channels and data blocks can be employed.

FIG. 11(2) shows a method in which, starting from the first one of data frames accumulated in the transmission buffer, one of the data frames is assigned to one of the radio channels. This assignment to each of the radio channels is repeated until the total data size in each radio channel reaches the largest size that does not exceed the maximum data size Dmax. In this manner, data blocks are generated. In the shown example, the data frames 1, 2, and 3 are assigned to the radio channels #1, #2, and #3 in the first round, respectively. The data frames 4, 5, and 6 are assigned to the radio channels #1, #2, and #3 in the second round, respectively. As a result, the data frames 1 and 4 are assigned to the radio channel #1, the data frames 2 and 5 are assigned to the radio channel #2, and the data frames 3 and 6 are assigned to the radio channel #3.

If the data size in the radio channel #2 exceeds the maximum data size Dmax when the data frame 5 is assigned to the radio channel #2 in the second round, for example, the assignment of the data frame 5 passes the radio channel #2. Instead, the data frame 5 is assigned to the radio channel #3 and it is checked whether or not the data size in the radio channel #3 exceeds the maximum data size Dmax. This operation is repeated. In the case where the data frame 5 cannot be assigned to any of the wireless channels, the assignment of the data frames ends with the assignment of the data frame 4.

FIG. 11(3) shows a method in which, starting from the first one of the data frames accumulated in the transmission buffer, one of the data frames is assigned to one of the radio channels, and a next data frame is assigned to one of the radio channels which has the smallest total data size of assigned data frames. The assignment of the next data frame is repeated until the total data size in each radio channel reaches the largest size that does not exceed the maximum data size Dmax. In this manner, data blocks are generated.

In the shown example, the data frames 1, 2, and 3 are assigned to the radio channels #1, #2, and #3 in the first round, respectively; the following data frame, i.e. the data frame 4 is assigned to the radio channel #3; the following data frame, i.e., the data frame 5 is assigned to the radio channel #1; the following data frame, i.e., the data frame 6 is assigned to the radio channel #2; and the following data frame, i.e., the data frame 7 is assigned to the radio channel #3. As a result, the data frames 1 and 5 are assigned to the radio channel #1, the data frames 2 and 6 are assigned to the radio channel #2, and the data frames 3, 4, and 7 are assigned to the radio channel #3.

If the data size in the radio channel #2 exceeds the maximum data size Dmax when the data frame 6 is assigned to the radio channel #2, for example, there is no other radio channel that can accommodate the data frame 6. Thus, the assignment of the data frames ends with the assignment of the data frame 5.

The assignment and management method shown in FIG. 11(3) allows for assignment of up to 7 data frames and therefore has the highest transmission efficiency among the aforementioned three assignment and management methods. However, this depends on the data sizes of the data frames accumulated in the transmission buffer. That is, it cannot be determined which one of the methods is the best. Therefore, for the data frames accumulated in the transmission buffer, the number of data frames that can be assigned by each of the three assignment and management methods may be compared with those by other methods and one of the assignment and management methods that can maximize the number of assigned data frames may be employed.

When the transmission rates of the respective radio channels are different, the maximum size Dmax·Ri/Rmax in each radio channel may be determined assuming that a transmission rate of each radio channel is Ri, the maximum transmission rate is Rmax, and the maximum size that can be transmitted on each radio channel is Dmax. In accordance with the thus determined maximum size, the process for aggregating the data frames may be performed for each radio channel.

Embodiment 7

Figure 12:
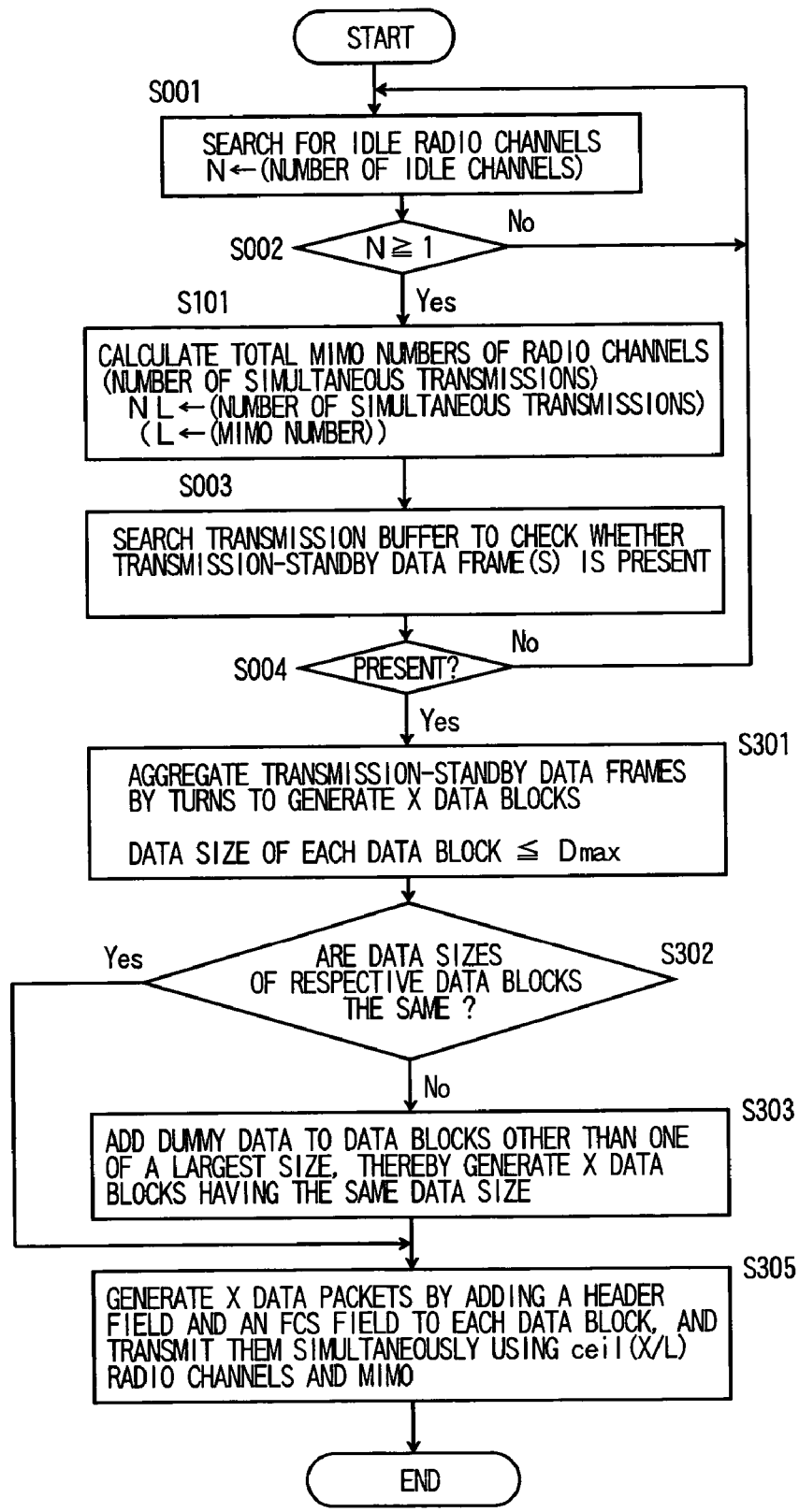
FIG. 12 is a flowchart of a procedure according to a seventh embodiment of the present invention.

FIG. 12 is a flowchart according to a seventh embodiment of the present invention.

A feature of the present embodiment is to use MIMO in the sixth embodiment. An idle radio channel is searched from all available channels by carrier sense (S001). The number of the detected idle channels is assumed to be N. In the case where one or more idle radio channels are detected, a total number of MIMOs of the respective radio channels is calculated as "a number of simultaneous transmissions" (S002 and S101). For simplification, the description is made assuming that the MIMO numbers of the respective radio channels are the same and the number of simultaneous transmissions is a product (NL) of the number N of idle channels and the MIMO number L.

Next, it is searched whether or not there is a transmission-standby data frame in a transmission buffer (S003). When no transmission-standby data frame is present, the procedure goes back to carrier sense. When there is a transmission-standby data frame, the procedure goes ahead (S004).

First, the number X (X≦NL) of data packets to be transmitted simultaneously is determined. Although the following description is made assuming that (N=1 and L≧2) or N≧2, a similar description can be applied to the case where N=1 and L=1 by setting X to 1. Next, the transmission-standby data frames are connected in order so as to generate X data blocks (S301). This connection of the data frames is performed in such a manner that the data size of each data block does not exceed the maximum data size Dmax that can be transmitted in one MAC frame (e.g., 2296 bytes).

Then, the data sizes of the respective data blocks are compared. When the data sizes are different, dummy data is added to each of data blocks other than a data block having the largest size, thereby making the data sizes of all the data blocks the same (S302 and S303). When the data sizes of the data blocks are the same, Step S303 for adding dummy data is omitted. Then, X data packets are generated by adding a header and the like to each of the data blocks. The thus generated X data packets are transmitted simultaneously using ceil (X/L) radio channels and MIMO (S305).

In the case where transmission rates of respective transmission media such as the radio channels or MIMO are different, the maximum size Dmax·L·Ri/Rmax for each transmission medium is determined assuming that a transmission rate of each transmission medium is Ri, the maximum transmission rate is Rmax, and the maximum size of data that can be transmitted by each transmission medium is Dmax. In accordance with the thus determined maximum size, the process for aggregating the data frames is performed for each transmission medium.

Embodiment 8

Figure 13:
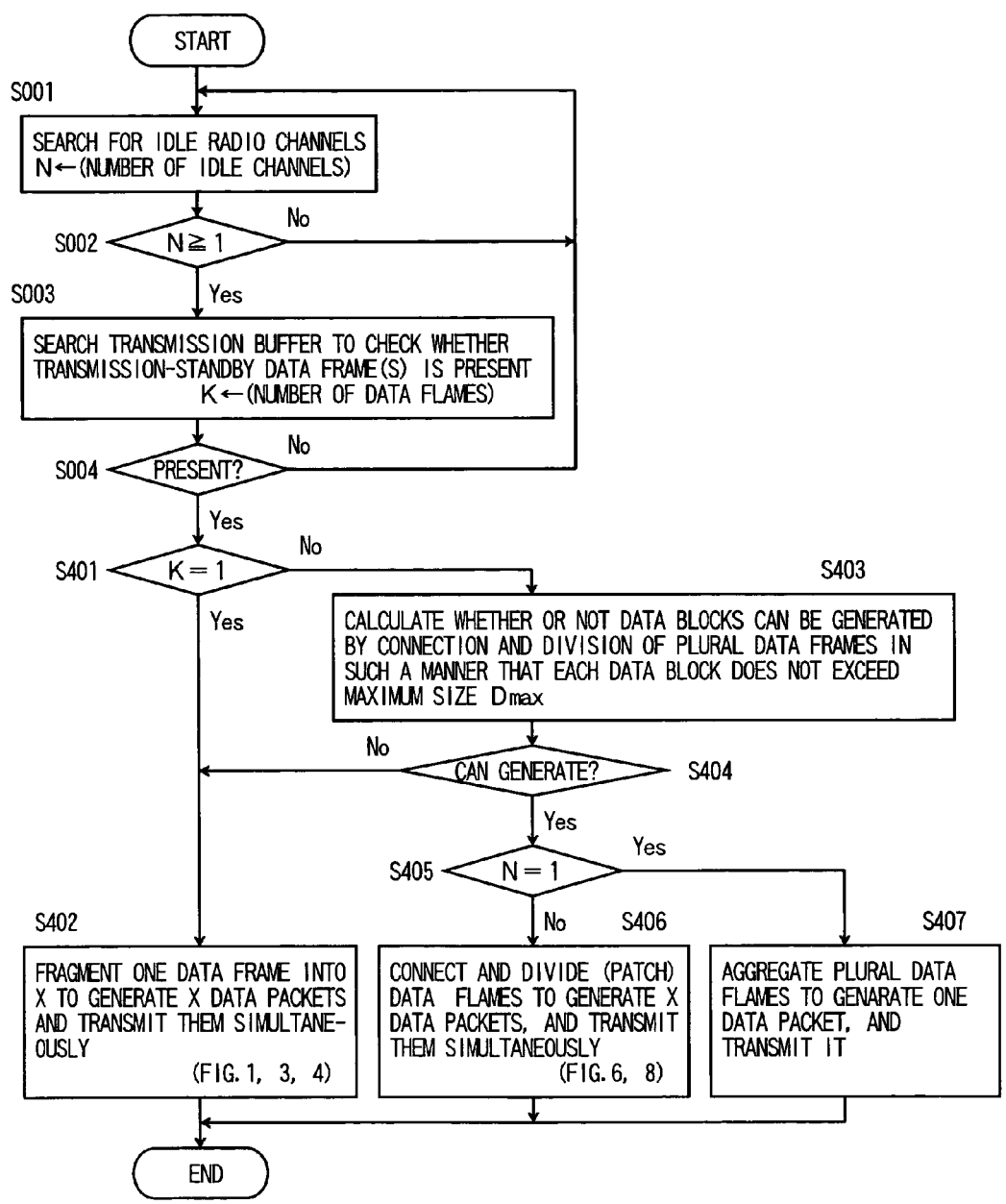
FIG. 13 is a flowchart of a procedure according to an eighth embodiment of the present invention.

FIG. 13 is a flowchart according to an eighth embodiment of the present invention.

In the present embodiment, a procedure is described which selects a frame fragmentation method described in the first to third embodiments or a frame patching method described in the fourth and fifth embodiments in accordance with the number K of transmission-standby data frames. Although the following description is made for the case where MIMO is not used, a similar description can be applied to a case of using MIMO.

When the number N of the idle channels is 1 or more and the number K of the data frames is 1 or more as a result of Steps S001 to S004, it is determined whether the number K of the data frames is 1 or 2 or more (S401). In the case where the number K of the data frames is 1, X data packets are generated by fragmenting one data frame based on the frame fragmentation method described in the first to third embodiments. The thus generated X data packets are then transmitted simultaneously (S402).

In the case where the number K of the data frames is 2 or more, it is calculated whether or not data blocks can be generated so as not to exceed the maximum size Dmax by connecting and dividing a plurality of data frames (S403). If such generation of the data blocks is impossible, the frame patching method cannot be applied. Thus, X data packets are generated by dividing one data frame based on the frame division method described in the first to third embodiments. The thus generated X data packets are transmitted simultaneously (S404 and S402). For example, when a ratio of transmission rates of two radio channels is 1:9 and there are two data frames of 1500 bytes, one of two data frames of 300 bytes and 2700 bytes that are generated by the connection and division exceeds Dmax (2296 bytes). Therefore, those two generated data frames cannot be transmitted simultaneously. Instead, data packets (150 bytes and 1350 bytes) generated by dividing each data frame into two are transmitted simultaneously.

On the other hand, if the aforementioned generation of the data blocks is possible, X data packets are generated by the frame patching method described in the fourth and fifth embodiments and are transmitted simultaneously, when the number N of the idle channels is 2 or more (S405 and S406). When the number N of the idle channels is 1, only one data packet can be transmitted. Thus, data parts of transmission-standby data frames are aggregated so as not to exceed the maximum data size Dmax, thereby generating one data packet. The thus generated one data packet is transmitted by using one radio channel (S407).

Embodiment 9

Figure 14:
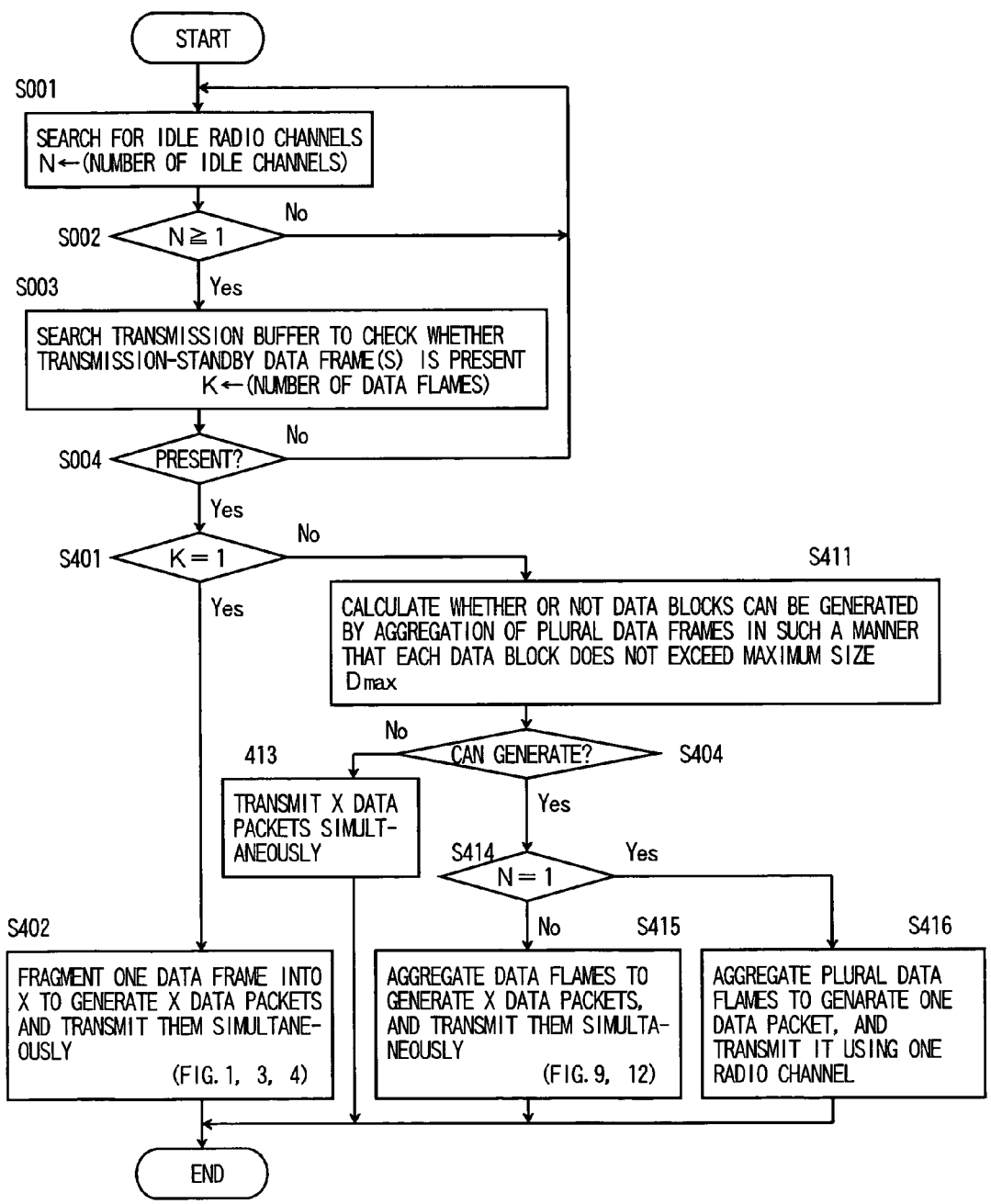
FIG. 14 is a flowchart of a procedure according to a ninth embodiment of the present invention.

FIG. 14 is a flowchart according to a ninth embodiment of the present invention.

In the present embodiment, a procedure is described which selects the frame fragmentation method described in the first to third embodiments or a frame aggregation method described in the sixth and seventh embodiments in accordance with the number K of transmission stand-by data frames. Although the following description is made for the case where MIMO is not used, a similar description can be applied to a case of using MIMO.

When the number N of the idle channels is 1 or more and the number K of the data frames is 1 or more as a result of Steps S001 to S004, it is determined whether the number K of the data frames is 1 or 2 or more (S401). In the case where the number K of the data frames is 1, X data packets are generated by fragmenting one data frame based on the frame fragmentation method described in the first to third embodiments and are transmitted simultaneously (S402).

In the case where the number K of the data frames is 2 or more, it is calculated whether or not data blocks can be generated by aggregating a plurality of data frames in such a manner that the size of each data block does not exceed the maximum size Dmax (S411). If such generation of the data blocks is not possible, the frame aggregation method cannot be applied. Thus, data packets are generated from X data frames, respectively, and are transmitted simultaneously (S412 and S413). For example, when all of a plurality of data packets have sizes of 1200 bytes or more, it is not possible to connect a plurality of data packets within Dmax (2296 bytes). Therefore, data packets having the same packet time length are generated from those data frames and are transmitted simultaneously.

On the other hand, if the aforementioned generation of the data blocks is possible, X data packets are generated by the frame aggregation method described in the sixth and seventh embodiments and are transmitted simultaneously, when the number N of the idle channels is 2 or more (S414 and S415). When the number N of the channels is 1, only one data packet can be transmitted. Thus, data parts of transmission-standby data frames are aggregated so as not to exceed the maximum data size Dmax, thereby generating one data packet. The thus generated one data packet is transmitted by using one radio channel (S416).

Embodiment 10

In the aforementioned embodiments, as shown in FIG. 2, for example, after two data packets F1a and F1b generated by fragmenting one data frame F1 are transmitted simultaneously, when a next data packet is transmitted, carrier sense is performed. In this case, when the corresponding radio channel is used by another STA, a channel occupied time is shortened, although a transmission time is shortened by using simultaneous transmission so as to improve the throughput. That is, the effective throughput of an STA of interest is not always improved. The present embodiment and an eleventh embodiment contribute to improvement of the effective throughput of that STA.

Figure 15:
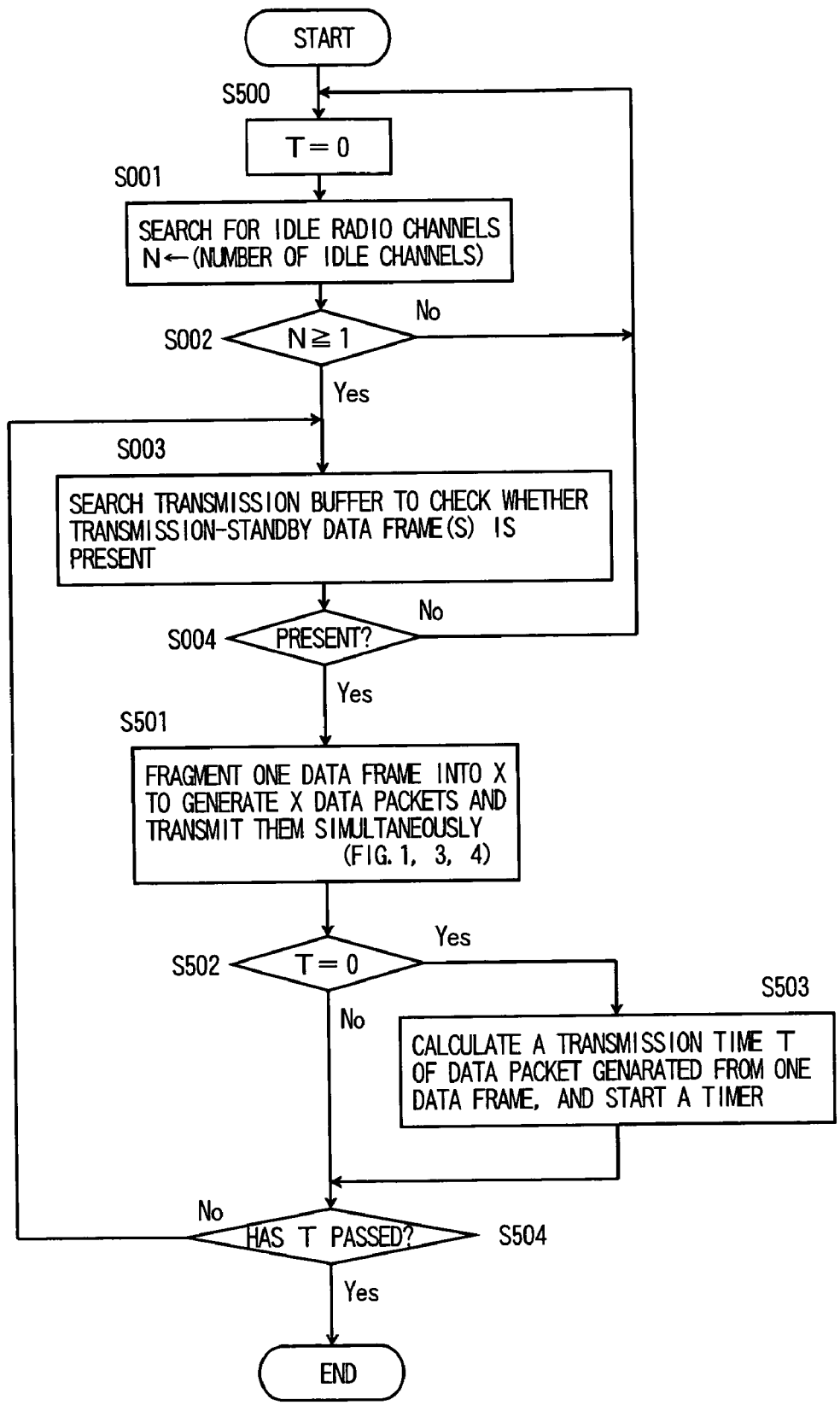
FIG. 15 is a flowchart of a procedure according to a tenth embodiment of the present invention.
Figure 16:
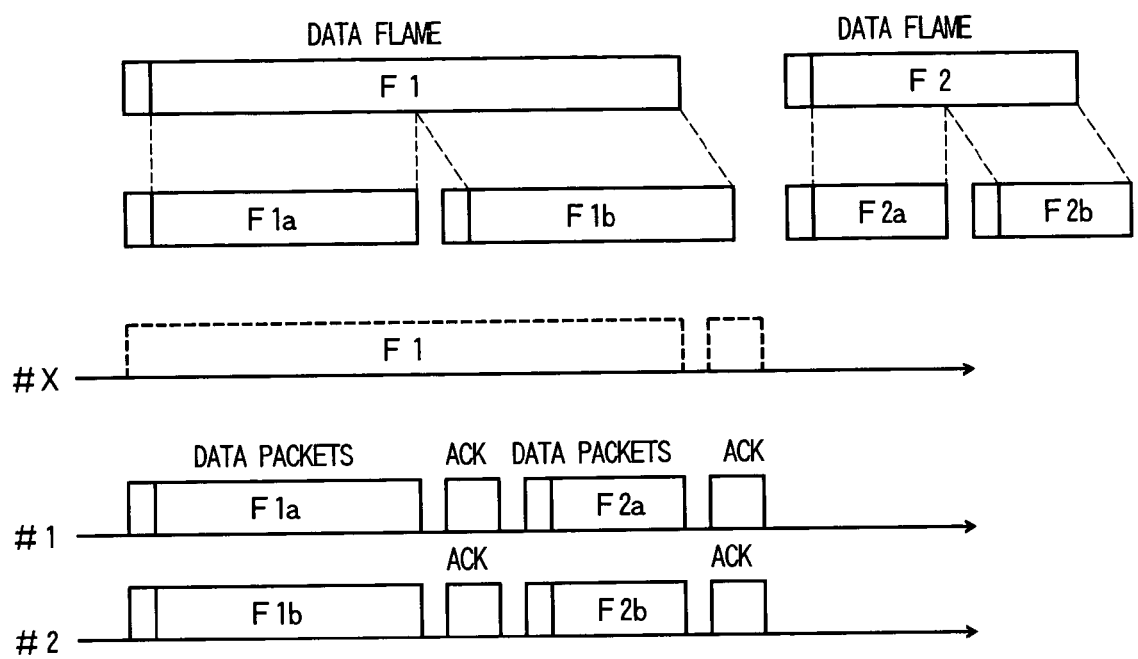
FIG. 16 is a time chart of an exemplary operation in the tenth embodiment of the present invention.

FIG. 15 is a flowchart according to the tenth embodiment of the present invention. FIG. 16 shows an exemplary operation in the tenth embodiment of the present invention. It is assumed that two radio channels #1 and #2 are provided between two STAs. In the following description, transmission stand-by data packets in a transmission buffer are data packets transmitted between those two STAs.

First, a transmission time in the case where one data frame is transmitted as one data packet without being fragmented is assumed to be T. T is set to 0 in default setting (S500).

An idle radio channel is searched from all available radio channels by carrier sense (S001). The number of the detected idle channels is assumed to be N. When one or more idle radio channels are detected, it is searched whether or not there is a transmission-standby data frame in the transmission buffer (S002 and S003). When no transmission-standby data frame is present, the procedure goes back to carrier sense. When there is a transmission-standby data frame, the procedure goes ahead (S004). In the case where N=1, one data packet is generated from one data frame and is then transmitted by using one radio channel, as in the first embodiment. However, this case is not shown in the drawings.

In the case where N≧2, X data packets are generated from one data frame by the frame fragmentation method described in the first to third embodiments, and are then transmitted simultaneously (S501). Moreover, a transmission time T of those data packets generated from the data frame is calculated and a timer is made to start (S502 and S503). Then, the procedure goes back to Step S003 and next data packets are transmitted simultaneously by using the currently idle channel without performing carrier sense. The transmission of the next data packets is continuously performed until the time T passes after the start of the timer (S504). Please note that continuous transmission of data packets can be performed in accordance with a Group ACK procedure that is discussed in IEEE802.11TGe, for example.

In the example of FIG. 16, after two data packets F1a and F1b that are generated by fragmenting a data frame F1 are transmitted simultaneously, two data packets F2a and F2b that are generated by fragmenting the following data frame F2 can be continuously transmitted simultaneously. Therefore, the effective throughput can be improved.

Embodiment 11

Figure 17:
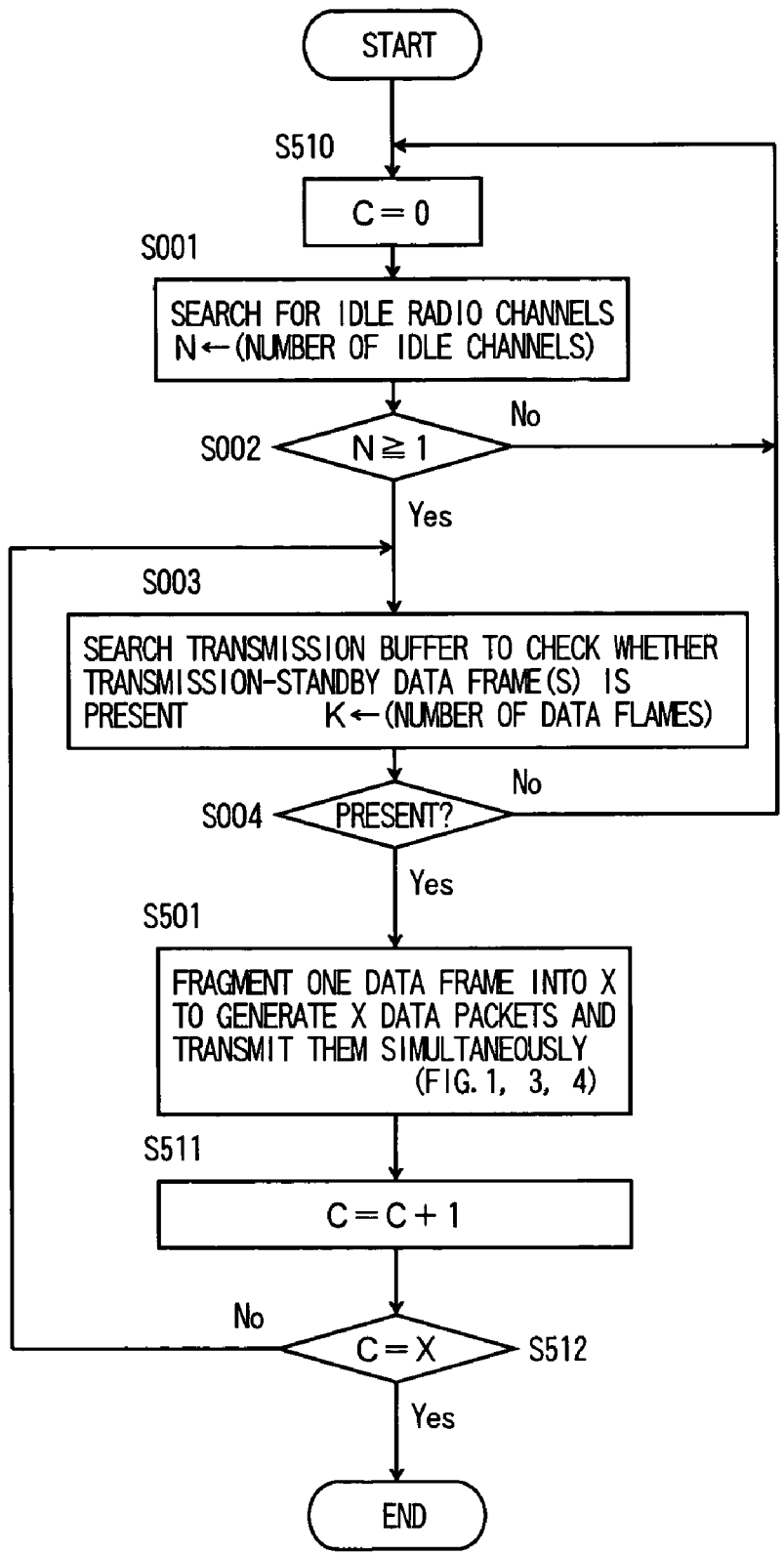
FIG. 17 is a flowchart of a procedure according to an eleventh embodiment of the present invention.

FIG. 17 is a flowchart according to the eleventh embodiment of the present invention.

The present embodiment has a feature that the number of consecutive transmissions that corresponds to the number of fragmentation X is employed as a period of consecutive transmissions.

First, the number of consecutive transmissions is assumed to be C and C is set to 0 in default setting. X data packets are generated from one data frame by the frame fragmentation method described in the first to third embodiments, and are transmitted simultaneously (S501). At this time, the number of consecutive transmissions C is incremented (S511). Then, the procedure goes back to Step S003 and next data packets are continuously transmitted simultaneously by using the currently idle channel without performing carrier sense. This transmission is repeated until C reaches X (S512).

Embodiment 12

Figure 18:
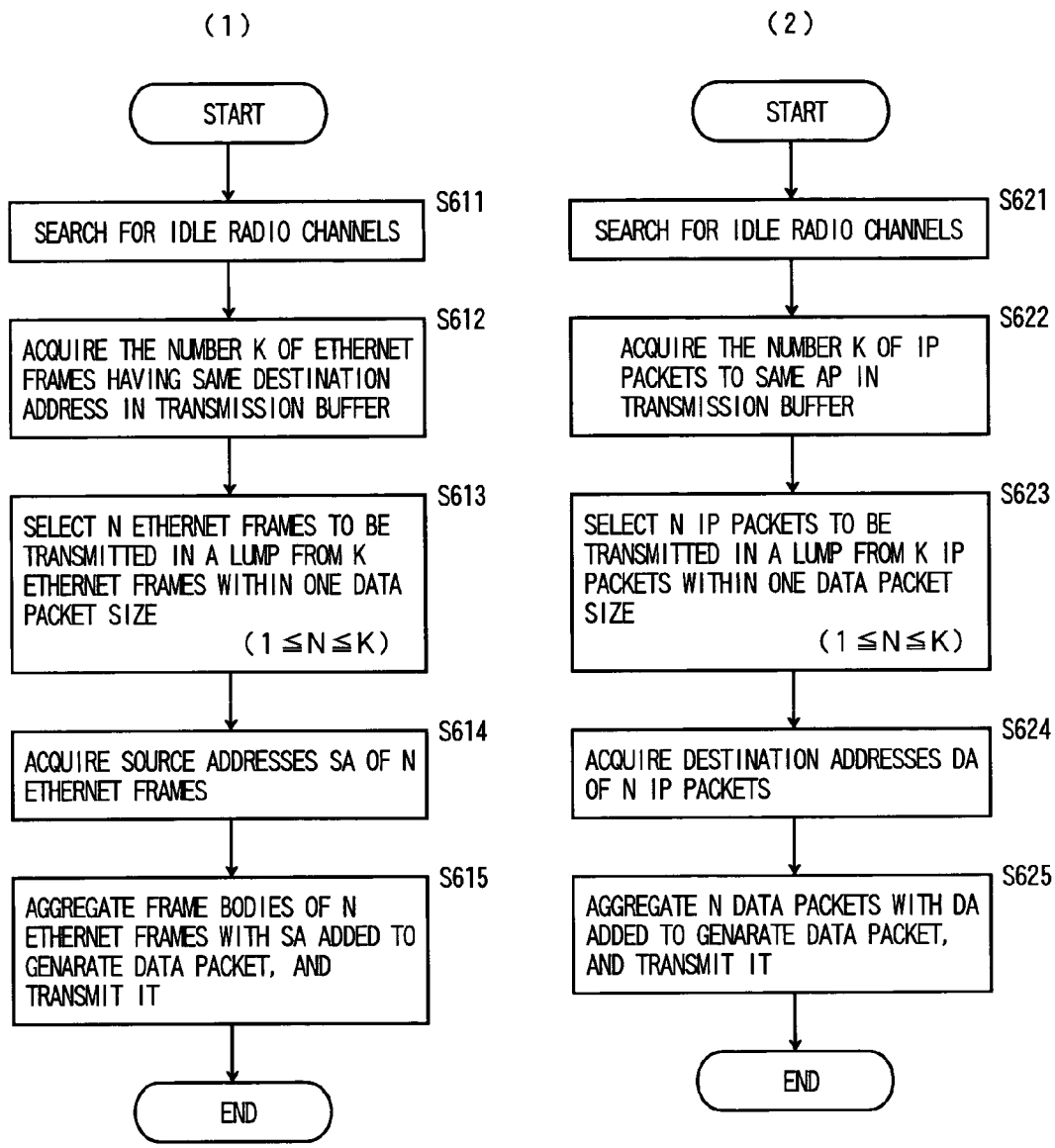
FIG. 18 is flowcharts of procedures according to a twelfth embodiment of the present invention.
Figure 19:
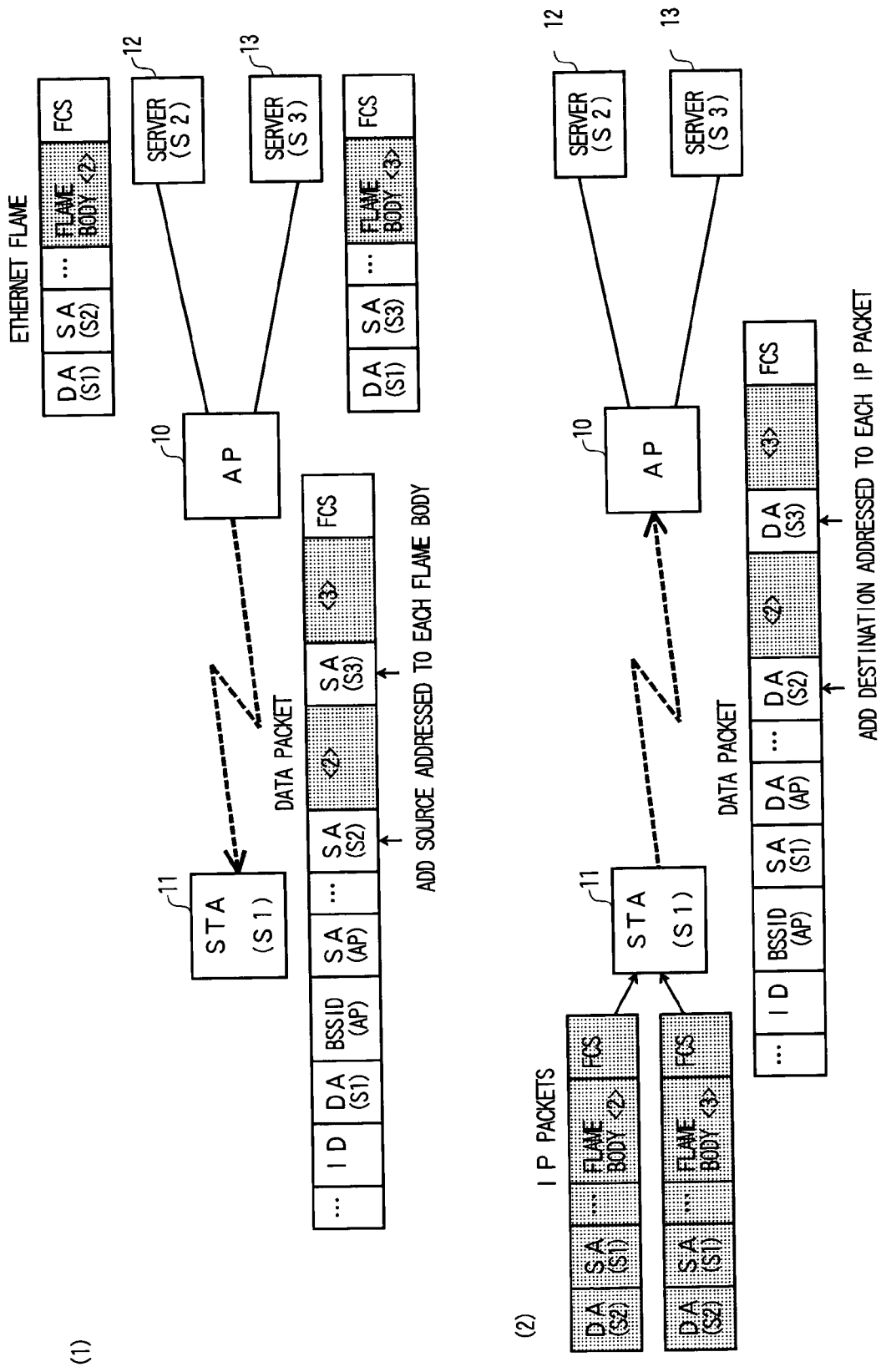
FIG. 19 is a diagram showing frame formats for an uplink and a downlink in the twelfth embodiment of the present invention.

FIG. 18 is flowcharts according to a twelfth embodiment of the present invention. FIG. 18(1) shows a procedure of an AP in a downlink, and FIG. 18(2) shows a procedure of a mobile terminal in an uplink. FIG. 19 shows exemplary frame formats for the downlink and the uplink in the twelfth embodiment.

Referring to FIG. 18(1), when Ethernet frames are accumulated in a transmission buffer, the AP searches an idle radio channel by carrier sense (S611). Then, the AP acquires the number K of Ethernet frames that are the same in a destination address (an address of a mobile terminal) as the first Ethernet frame in the transmission buffer (S612). Then, the AP selects N (1≦N≦K) Ethernet frames that are to be transmitted in one lump from the K Ethernet frames within a range in which the selected Ethernet frames can be accommodated in one wireless packet (S613). The AP also acquires a source address (SA) from a header of each of the N Ethernet frames (S614). Then, the AP adds control information to a frame body (IP packet) of each of the N Ethernet frames. The control information contains the source address SA of the corresponding Ethernet frame. The AP generates a wireless packet that contains a frame body obtained by aggregating the frame bodies of the N Ethernet frames with the control information added thereto and also contains a MAC header and FCS added to the frame body. The MAC header contains a destination address DA, BSSID, and a source addresses SA. The AP transmits the thus generated wireless packet (S615). The frame body of that wireless packet is generated so as not to exceed the maximum data size that can be transmitted in one MAC frame (e.g., 2296 bytes).

FIG. 19(1) shows an example in which an AP 10 generates one wireless packet from Ethernet frames transmitted from servers 12 and 13 and transmits it in one lump. In the MAC header of the wireless packet, an identifier for specifying a frame format, "S1" as the destination address DA, "AP" as BSSID, and a given address (e.g., AP) as the source address SA are set. The frame body of the wireless packet accommodates the frame body (IP packet) of the Ethernet frame transmitted from the server 12 with its source address SA (S2) added thereto and the frame body (IP packet) of the Ethernet frame transmitted from the server 13 with its source address SA (S3) added thereto.

Returning to FIG. 18(2), the mobile terminal searches an idle radio channel by carrier sense, when IP packets are accumulated in the transmission buffer (S621). Then, the mobile terminal acquires the number K of IP packets in the transmission buffer that are sent to the same AP (S622). The mobile terminal selects N (1≦N≦K) IP packets that are to be transmitted in one lump from the K IP packets within a range in which the selected IP packets can be accommodated in one wireless packet (S623). The mobile terminal acquires a destination address DA from an IP header of each of the N IP packets (S624). Then, the mobile terminal adds control information to a frame body of each of the N IP packets. The control information contains the destination address DA of the corresponding IP packet. The mobile terminal then generates a wireless packet that contains a frame body obtained by aggregating the N frame bodies with the control information added thereto and also contains a MAC header and FCS added to the frame body. The MAC header contains BSSID, a source address SA, and a destination address DA. The mobile terminal transmits the thus generated wireless packet (S625). The frame body of that wireless packet is generated so as not to exceed the maximum data size that can be transmitted in one MAC frame (e.g., 2296 bytes).

FIG. 19(2) shows an example in which one wireless packet is generated from IP packets to servers 12 and 13 in a mobile terminal 11 and is transmitted in one lump. In the MAC header of the wireless packet, an identifier for specifying a frame format, "AP" as BSSID, "S1" as the source address SA, and a given address (e.g., AP) as the destination address DA are set. The frame body of the wireless packet accommodates the IP packet to the server 12 with its destination address DA (S2) added thereto and the IP packet to the server 13 with its destination address DA (S3) added thereto.

Embodiment 13

Figure 20:
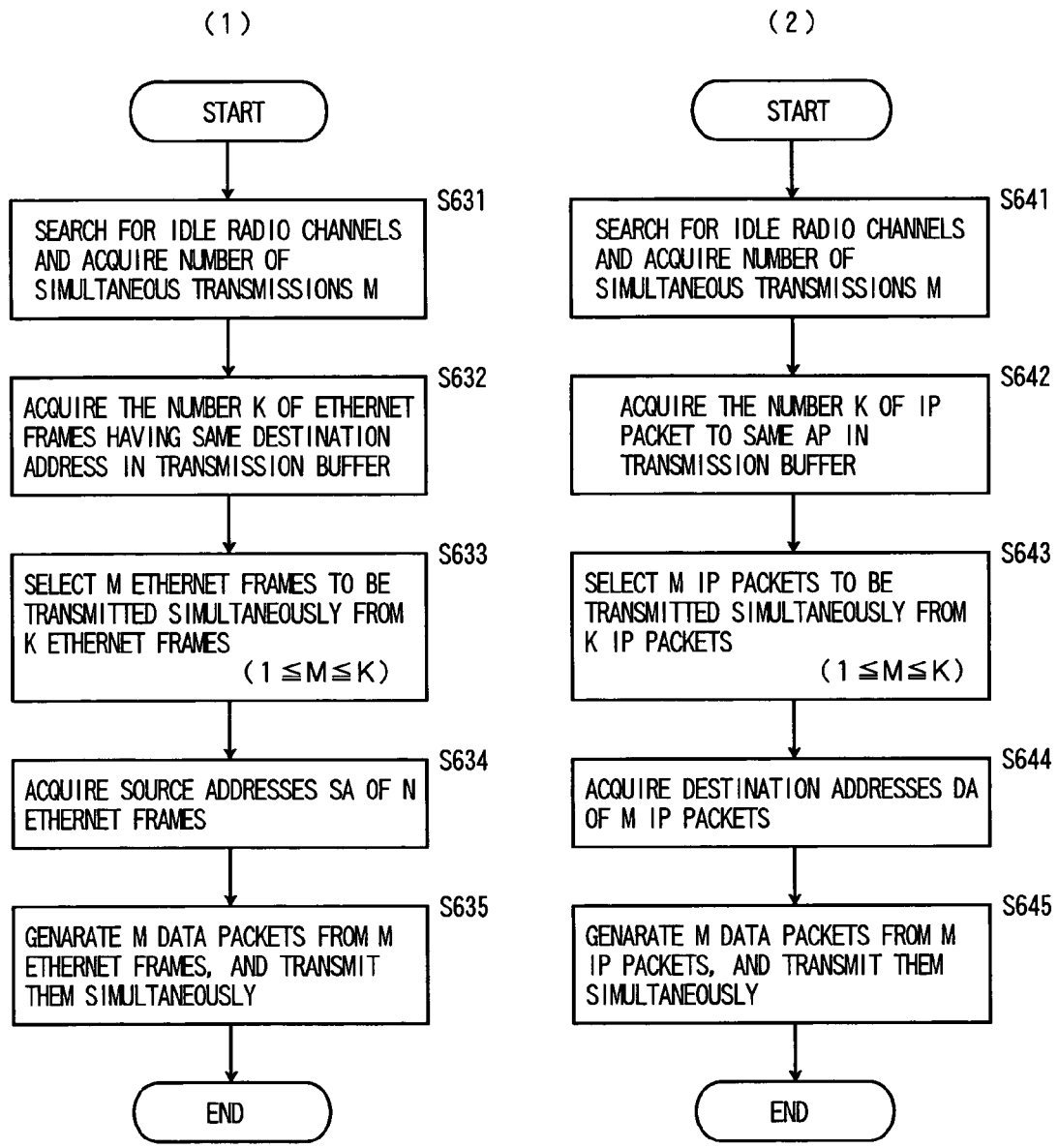
FIG. 20 includes flowcharts of procedures according to a thirteenth embodiment of the present invention.
Figure 21:
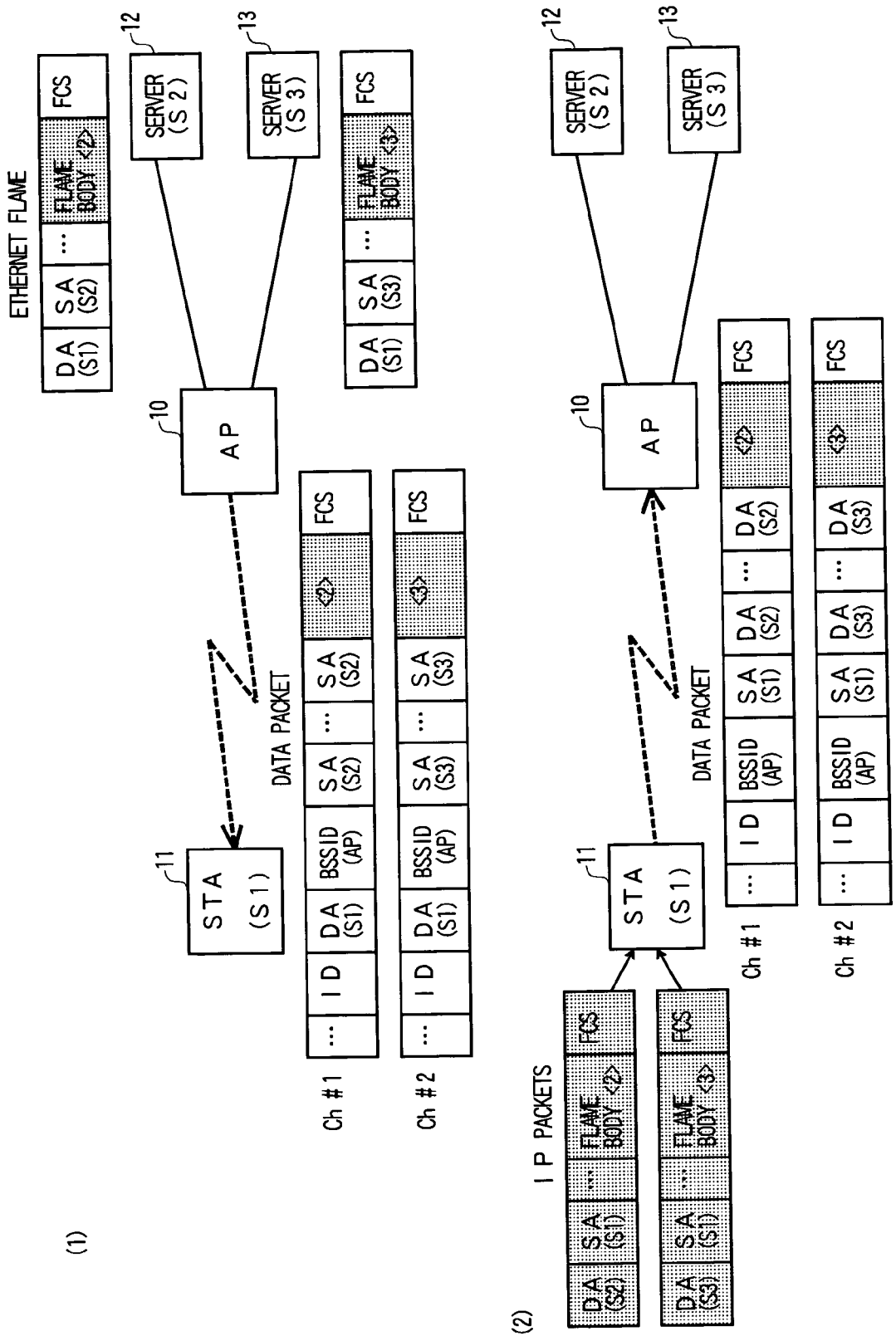
FIG. 21 is a diagram showing frame formats for an uplink and a downlink in the thirteenth embodiment of the present invention.

FIG. 20 includes flowcharts according to the thirteenth embodiment of the present invention. FIG. 20(1) shows a procedure of an AP in a downlink, and FIG. 20(2) shows a procedure of a mobile terminal in an uplink. FIG. 21 shows frame formats for the downlink and the uplink in the thirteenth embodiment.

Referring to FIG. 20(1), when Ethernet frames are accumulated in a transmission buffer, the AP searches an idle radio channel by carrier sense and acquires a number of simultaneous transmissions M (S631). In this description, a case is considered in which simultaneous transmission is performed using a plurality of radio channels. Alternatively, MIMO number or a number corresponding to a total number of MIMOs of a plurality of radio channels in the case where MIMO is used may be used as the number of simultaneous transmissions M.

Then, the AP acquires the number K of Ethernet frames that are the same in a destination address (an address of a mobile terminal) as the first Ethernet frame in the transmission buffer (S632). Then, the AP selects M (M≦K) Ethernet frames that are to be transmitted simultaneously from the K Ethernet frames (S633), and acquires a source address (SA) from a header of each of the M Ethernet frames (S634). Then, the AP adds control information to a frame body (IP packet) of each of the M Ethernet frames. The control information contains the source address SA of the corresponding Ethernet frame. The AP further adds a MAC header containing a destination address DA, BSSID, and a source address SA and FCS to each of the M Ethernet frames, thereby generating wireless packets. The AP transmits the thus generated wireless packets simultaneously (S635).

FIG. 21(1) shows an example in which an AP 10 generates wireless packets from Ethernet frames respectively transmitted from servers 12 and 13 and transmits those wireless packets simultaneously by using two radio channels. In the MAC header of a wireless packet transmitted on a radio channel #1, "S1" as the destination address DA, "AP" as BSSID, and "S2" as the source address SA are set. In the MAC header of a wireless packet transmitted on a radio channel #2, "S1" as the destination address DA, "AP" as BSSID, and "S3" as the source address SA are set. The frame bodies of the wireless packets accommodate the frame bodies (IP packets) of the Ethernet frames transmitted from the servers 12 and 13 with their source addresses SA, respectively. Please note that the source address SA that is put before the frame body may be omitted.

Returning to FIG. 20(2), when IP packets are accumulated in the transmission buffer, the mobile terminal searches an idle radio channel by carrier sense and acquires the number of simultaneous transmissions M (S641). Then, the mobile terminal acquires the number K of IP packets in the transmission buffer that are sent to the same AP (S642). The mobile terminal selects M (M≧K) IP packets that are to be transmitted simultaneously from the K IP packets (S643) and acquires a destination address DA from an IP header of each of the M IP packets (S644). Then, the mobile terminal generates wireless packets by adding control information containing the destination address DA of the corresponding IP packet to a frame body of each of the M IP packets and further adding a MAC header and FCS. The MAC header contains BSSID, a source address SA, and a destination address DA. The mobile terminal transmits the thus generated wireless packets simultaneously (S645).

FIG. 21(2) shows an example in which a mobile terminal 11 generates wireless packets from IP packets to servers 12 and 13, respectively, and transmits those wireless packets simultaneously by using two radio channels. In the MAC header of a wireless packet transmitted on a radio channel #1, "AP" as BSSID, "S1" as the source address SA, and "S2" as the destination address DA are set. In the MAC header of a wireless packet transmitted on a radio channel #2, "AP" as BSSID, "S1" as the source address SA, and "S3" as the destination address DA are set. The frame bodies of the wireless packets accommodate the IP packets to be transmitted to the servers 12 and 13 with their destination addresses DA, respectively. The destination address DA that is put before the frame body may be omitted.

Embodiment 14

Figure 22:
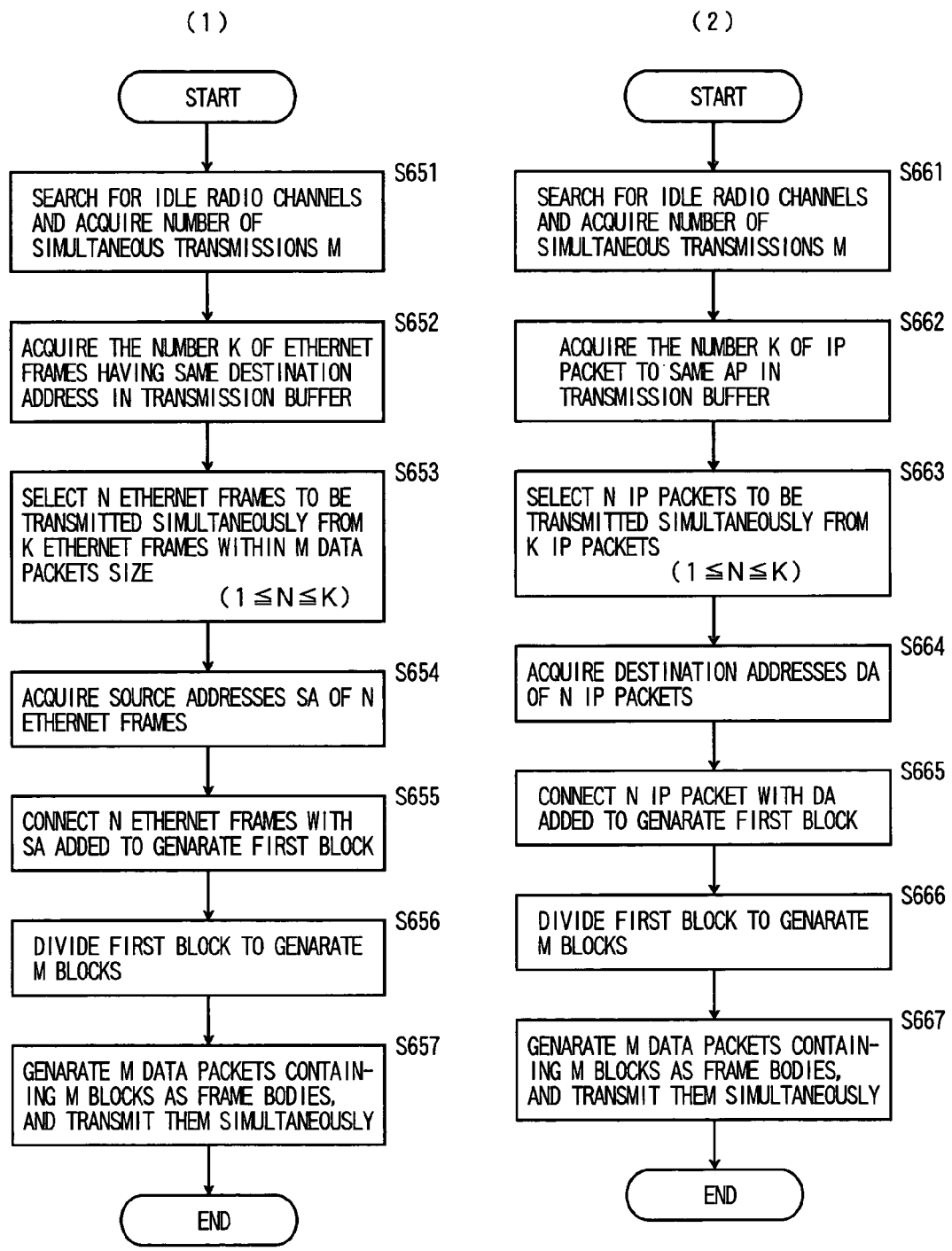
FIG. 22 includes flowcharts of procedures according to a fourteenth embodiment of the present invention.
Figure 23:
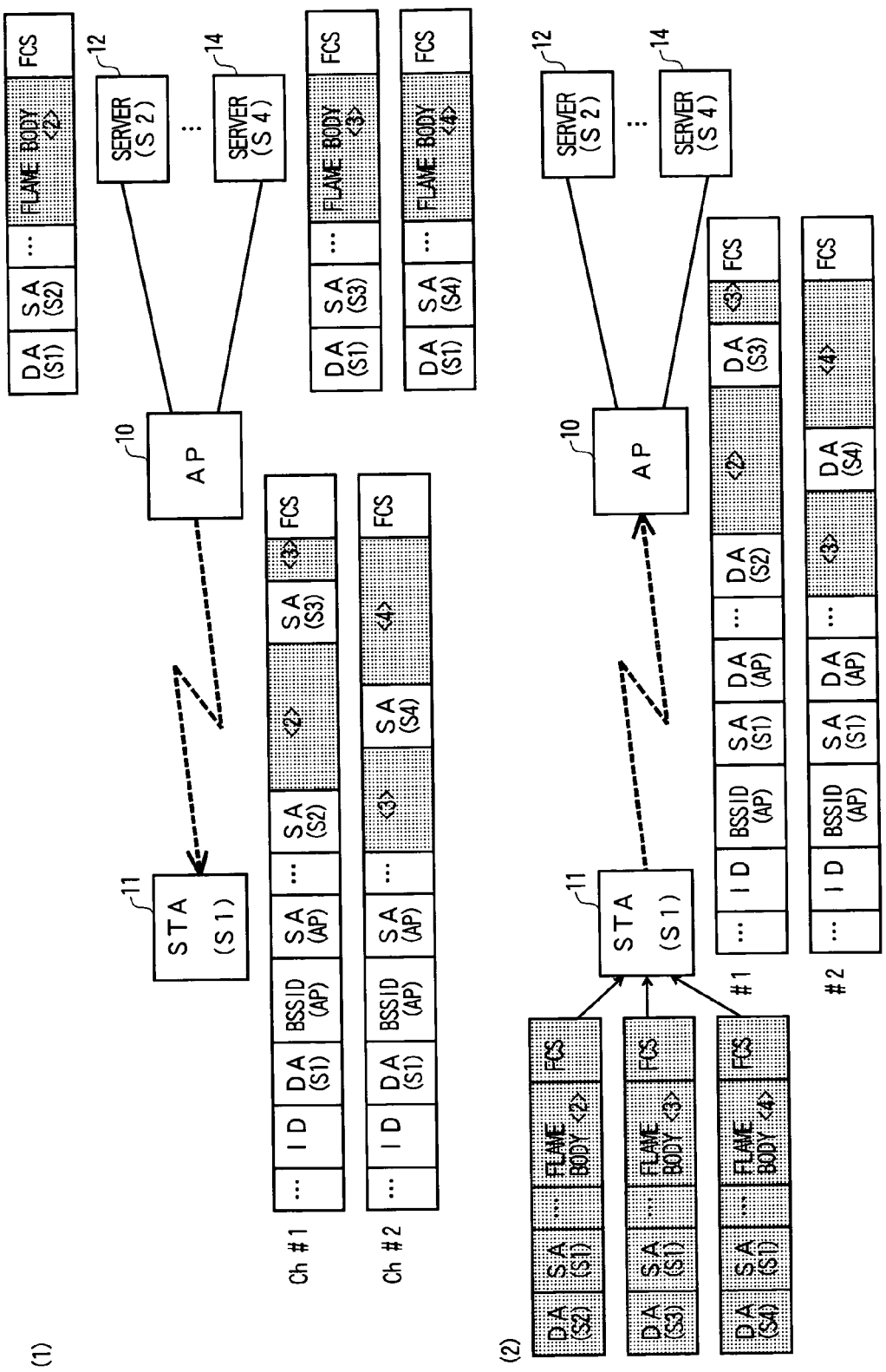
FIG. 23 is a diagram showing frame formats for an uplink and a downlink in the fourteenth embodiment of the present invention.

FIG. 22 includes flowcharts according to a fourteenth embodiment of the present invention. FIG. 22(1) shows a procedure of an AP in a downlink, and FIG. 22(2) shows a procedure of a mobile terminal in an uplink. FIG. 23 shows frame formats for the downlink and the uplink in the fourteenth embodiment.

Referring to FIG. 22(1), when Ethernet frames are accumulated in a transmission buffer, the AP searches an idle radio channel by carrier sense and acquires a number of simultaneous transmissions M (S651). In this description, a case is considered in which simultaneous transmission is performed using a plurality of radio channels. Alternatively, MIMO number or a number corresponding to a total number of MIMOs of a plurality of radio channels in the case where MIMO is used may be used as the number of simultaneous transmissions M.

Then, the AP acquires the number K of Ethernet frames that are the same in a destination address (an address of a mobile terminal) as the first Ethernet frame in the transmission buffer (S652). Then, the AP selects N ($1 \leq N \leq K$) Ethernet frames that are to be transmitted simultaneously from the K Ethernet frames within a range in which the selected Ethernet frames can be accommodated in M wireless packets (S653). The AP also acquires a source address SA from a header of each of the N Ethernet frames (S654). Then, the AP adds control information containing the source address SA of the corresponding Ethernet frame to a frame body (IP packet) of each of the N Ethernet frames, and connects the N frames bodies so as to generate a first block (S655). The AP divides the first block into M so as to generate M blocks (S656). The AP generates M wireless packets that accommodate the M blocks as frame bodies, respectively, by adding a MAC header that contains a destination address DA, BSSID, and a source address SA, and FCS to each of the frame bodies. The AP transmits the M wireless packets simultaneously (S657). The frame body of the wireless packet is generated so as not to exceed the maximum data size that can be transmitted in one MAC frame (e.g., 2296 bytes).

FIG. 23(1) shows an example in which an AP 10 converts three Ethernet frames respectively transmitted from servers 12 to 14 into two wireless packets and transmits those wireless packets simultaneously by using two radio channels. In this example, an Ethernet frame transmitted from the server 12 and a part of an Ethernet frame transmitted from the server 13 are aggregated to each other, and a remaining part of the Ethernet frame from the server 13 and an Ethernet frame from the server 14 are aggregated to each other. In the MAC header of a wireless packet transmitted on a radio channel #1, "S1" as the destination address DA, "AP" as BSSID, and a given address (e.g., AP) as the source address SA are set. In the MAC header of a wireless packet transmitted on a radio channel #2, "S1" as the destination address DA, "AP" as BSSID, and a given address (e.g., AP) as the source address SA are set. In the frame bodies of the wireless packets, the frame bodies (IP packets) of the Ethernet frames transmitted from the servers 12 to 14 are accommodated with the source addresses SA thereof, while being fragmented, if necessary.

Returning to FIG. 22(2), when IP packets are accumulated in the transmission buffer, the mobile terminal searches an idle radio channel by carrier sense and acquires the number of simultaneous transmissions M (S661). Then, the mobile terminal acquires the number K of IP packets in the transmission buffer that are sent to the same AP (S662). The mobile terminal selects N ($1 \leq N \leq K$) IP packets that are to be transmitted simultaneously from the K IP packets within a range in which the selected IP packets can be accommodated in M wireless packets (S663). The mobile terminal also acquires a destination address DA from an IP header of each of the N IP packets (S664). Then, the mobile terminal adds control information to each of the N IP packets. The control information contains the destination address DA of the corresponding IP packet. The mobile terminal then connects the N IP packets so as to generate a first block (S665) and thereafter generates M blocks by dividing the first block into M (S666). Then, the mobile terminal generates wireless packets by adding a MAC header and FCS to each of the M blocks serving as frame bodies of the wireless packets. The MAC header contains BSSID, a source address SA, and a destination address DA. The mobile terminal transmits those wireless packets simultaneously (S667).

FIG. 23(2) shows an example in which a mobile terminal 11 generates wireless packets from IP packets to the servers 12 to 14 and transmits those wireless packets simultaneously by using two radio channels. In this example, an IP packet to the server 12 and a part of an IP packet to the server 13 are aggregated to each other, and a remaining part of the IP packet to the server 13 and an IP packet to the server 14 are aggregated to each other. In the MAC header of a wireless packet transmitted on a radio channel #1, "AP" as BSSID, "S1" as the source address SA, and a given address (e.g., AP) as the destination address DA are set. In the MAC header of a wireless packet transmitted on a radio channel #2, "AP" as BSSID, "S1" as the source address SA, and a given address (e.g., AP) as the destination address DA are set. In the frame bodies of the wireless packets, the IP packets to the servers 12 to 14 are accommodated with the destination addresses DA thereof, while being fragmented, if necessary.

Embodiment 15

Figure 24:
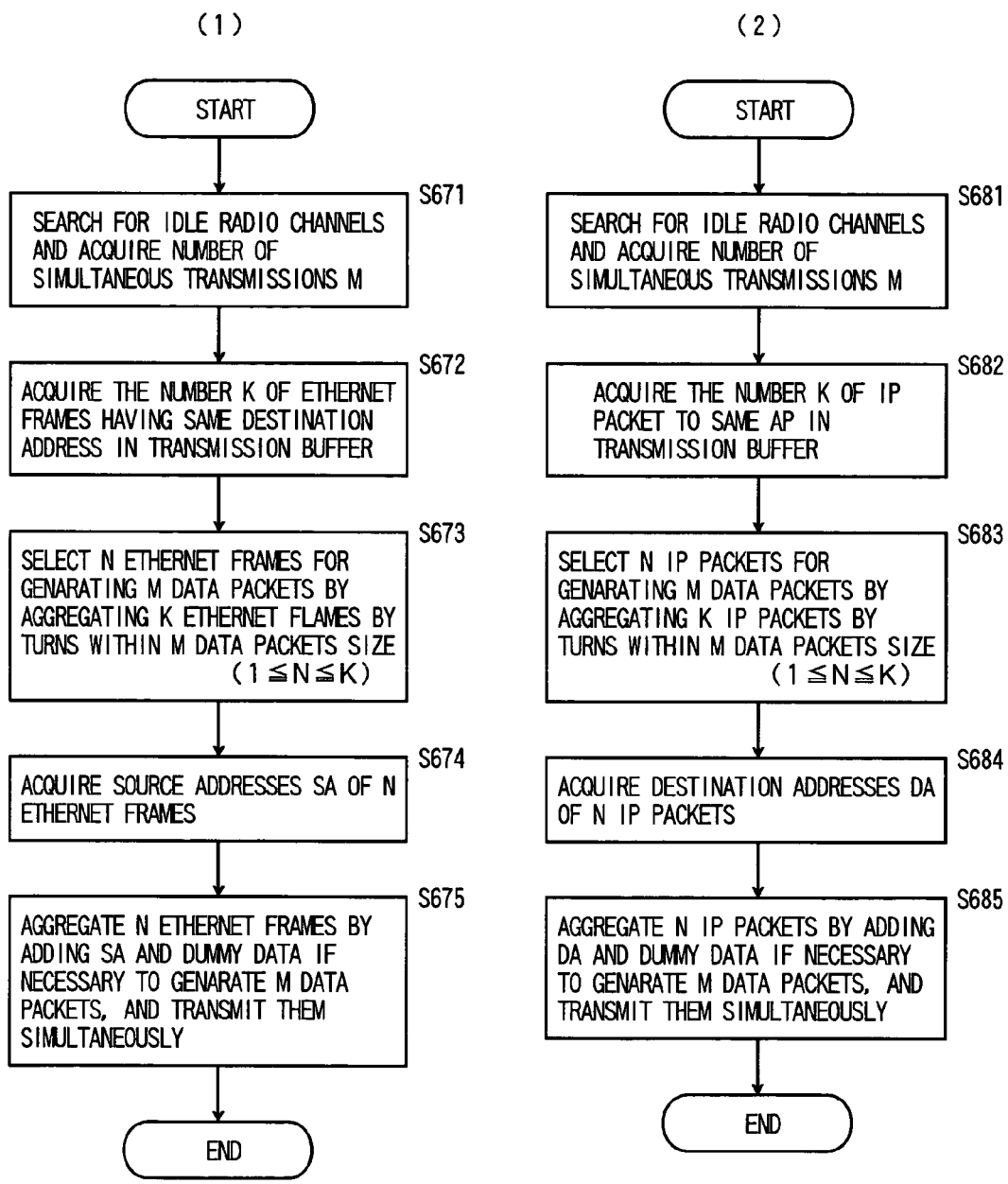
FIG. 24 includes flowcharts of procedures according to a fifteenth embodiment of the present invention.
Figure 25:
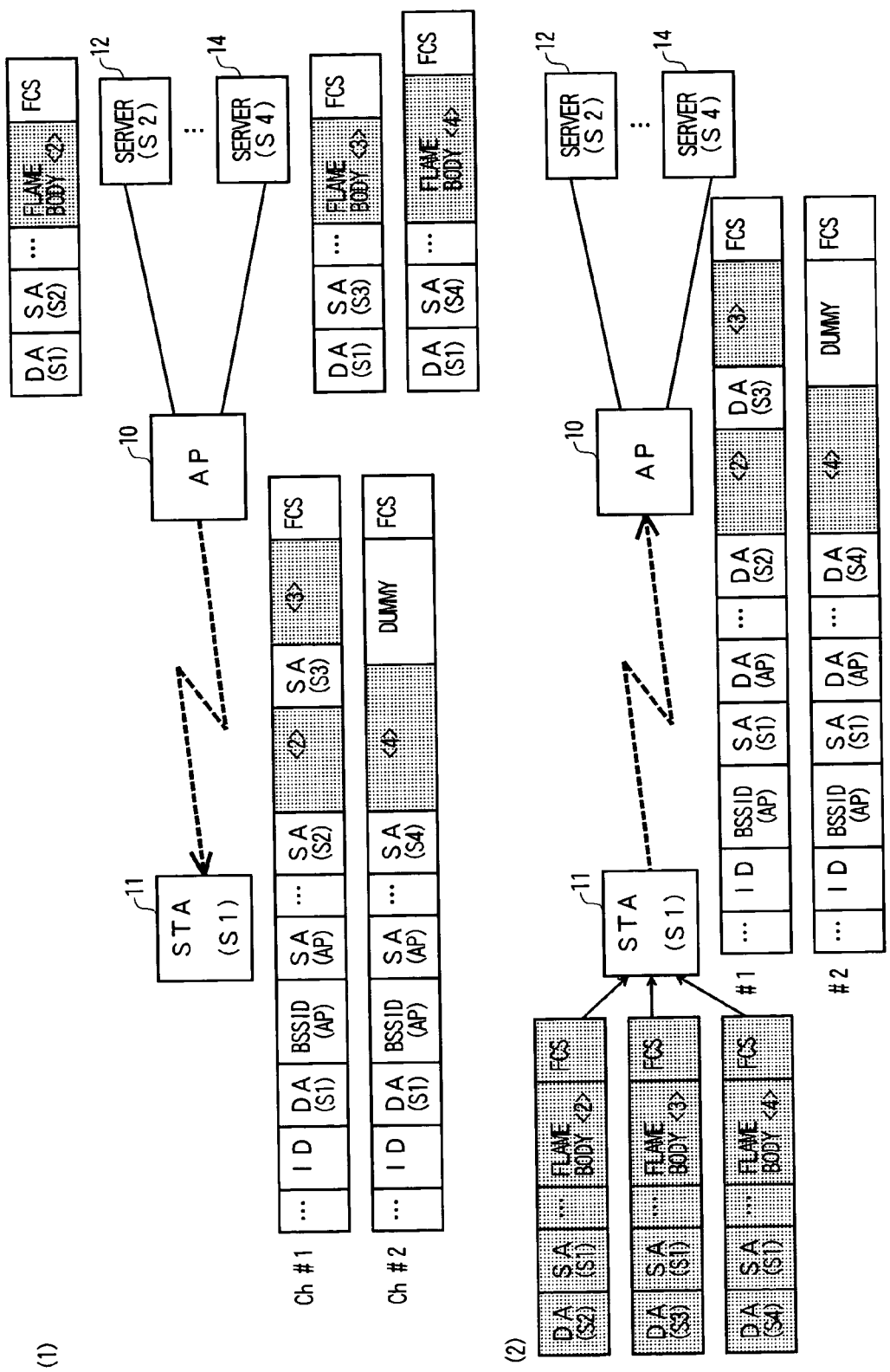
FIG. 25 is a diagram showing frame formats for an uplink and a downlink in the fifteenth embodiment of the present invention.

FIG. 24 includes flowcharts according to a fifteenth embodiment of the present invention. FIG. 24(1) shows a procedure of an AP in a downlink, and FIG. 24(2) shows a procedure of a mobile terminal in an uplink. FIG. 25 shows frame formats for the downlink and the uplink in the fifteenth embodiment.

Referring to FIG. 24(1), when Ethernet frames are accumulated in a transmission buffer, the AP searches an idle radio channel by carrier sense and acquires a number of simultaneous transmissions M (S671). In this description, a case is considered in which simultaneous transmission is performed using a plurality of radio channels. Alternatively, MIMO number or a number corresponding to a total number of MIMOs of a plurality of radio channels in the case where MIMO is used may be used as the number of simultaneous transmissions M.

Next, the AP acquires the number K of Ethernet frames that are the same in a destination address (an address of a mobile terminal) as the first Ethernet frame in the transmission buffer (S672). The AP then selects N ($1 \leq N \leq K$) Ethernet frames for generating M wireless packets, by aggregating the K Ethernet frames in order within a range in which the selected Ethernet frames can be accommodated in the respective wireless packets (S673). The AP also acquires a source address SA from a header of each of the N Ethernet frames (S674). Then, the AP adds control information containing the source address SA of the corresponding Ethernet frame to a frame body (IP packets) of each of the N Ethernet frames and aggregates the N frame bodies to one another, and generates M wireless packets in each of which a MAC header containing a destination address DA, BSSID, and a source address SA, and FCS are added. The AP then transmits the M wireless packets simultaneously (S675). In the case where the packet time lengths of the wireless packets are different, the packet time lengths of all the wireless packets are made the same by adding dummy data, if necessary.

FIG. 25(1) shows an example in which an AP 10 converts three Ethernet frames respectively transmitted from servers 12 to 14 into two wireless packets and transmits those wireless packets simultaneously by using two radio channels. In this example, an Ethernet frame from the server 12 and an Ethernet frame from the server 13 are aggregated to each other, and an Ethernet frame from the server 14 is aggregated to dummy data. In the MAC header of a wireless packet transmitted on a radio channel #1, "S1" as the destination address DA, "AP" as BSSID, and a given address (e.g., AP) as the source address SA are set. In the MAC header of a wireless packet transmitted on a radio channel #2, "S1" as the destination address DA, "AP" as BSSID, and a given address (e.g., AP) as the source address SA are set. In the frame bodies of the wireless packets, frame bodies (IP packets) of the Ethernet frames respectively transmitted from the servers 12 to 14 are accommodated in order with the source addresses SA thereof.

Returning to FIG. 24(2), when IP packets are accumulated in the transmission buffer, the mobile terminal searches an idle radio channel by carrier sense and acquires the number of simultaneous transmissions M (S681). Then, the mobile terminal acquires the number K of IP packets in the transmission buffer that are sent to the same AP (S682). The mobile terminal selects N (1≦N≦K) IP packets for generating M wireless packets by aggregating the K IP packets in order within a range in which the selected IP packets can be accommodated in the respective wireless packets (S683). The mobile terminal also acquires a destination address DA from an IP header of each of the N IP packets (5684). Then, the mobile terminal generates wireless packets by adding control information containing the destination address DA of the corresponding IP packet to each of the N IP packets, aggregating the N IP packets, and further adding MAC headers each containing BSSID, a source address SA, and a destination address DA, and FCSs. The mobile terminal transmits those wireless packets simultaneously (S685).

FIG. 25(2) shows an example in which a mobile terminal 11 generates wireless packets from IP packets to servers 12 to 14 and transmits those wireless packets simultaneously by using two radio channels. In this example, an IP packet to the server 12 and an IP packet to the server 13 are aggregated to each other, and an IP packet to the server 14 is aggregated to dummy data. In the MAC header of a wireless packet transmitted on a radio channel #1, "AP" as BSSID, "S1" as the source address SA, and a given address (e.g., AP) as the destination address DA are set. In the MAC header of a wireless packet transmitted on a radio channel #2, "AP" as BSSID, "S1" as the source address SA, and a given address (e.g., AP) as the destination address DA are set. In the frame bodies, the IP packets to the servers 12 to 14 are accommodated in order with the destination addresses DA thereof.

Embodiment 16

Figure 26:
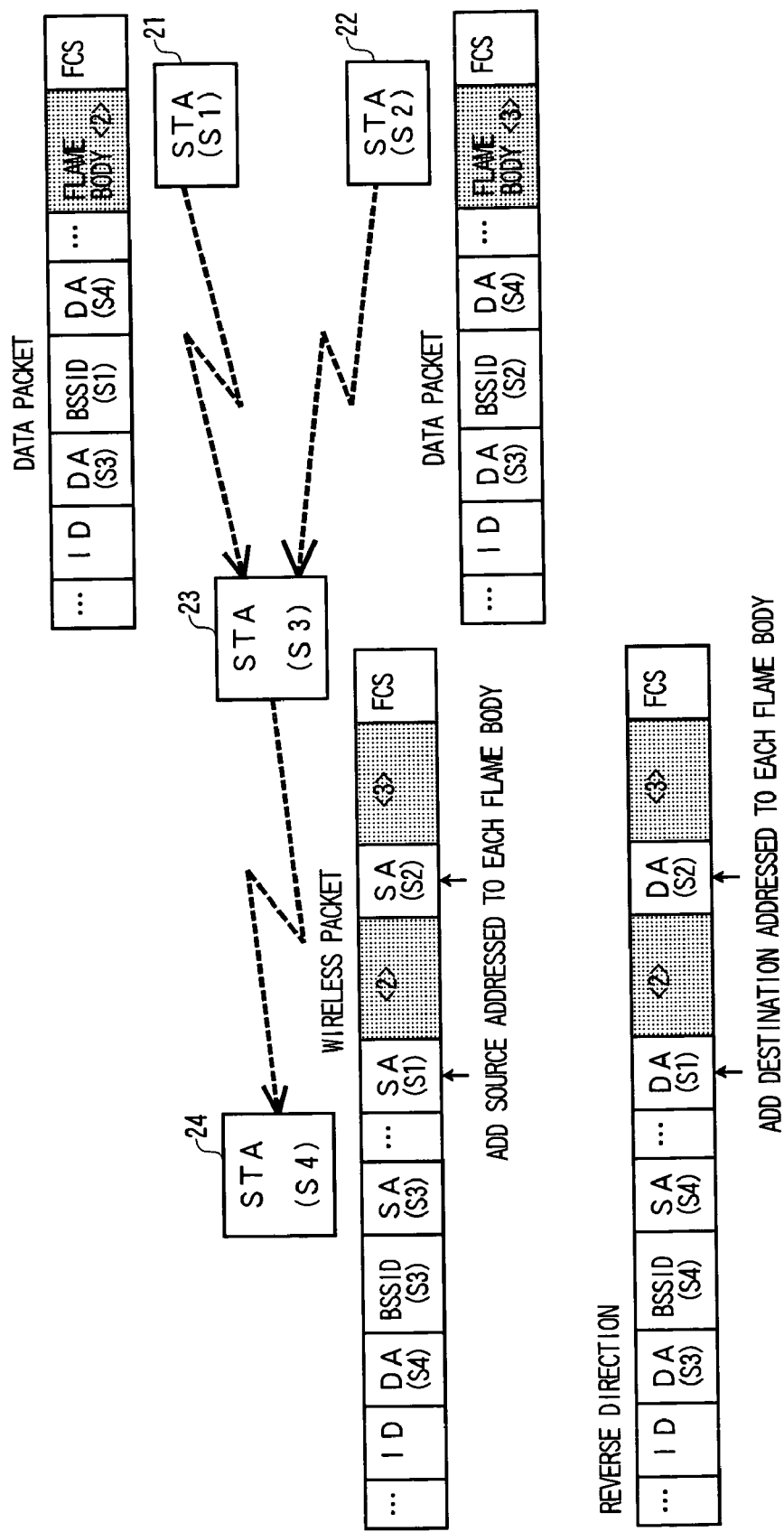
FIG. 26 is an exemplary frame format according to a sixteenth embodiment of the present invention.

FIG. 26 shows an exemplary frame format according to a sixteenth embodiment of the present invention. In the present embodiment, a wireless packet communication method corresponding to any of the twelfth to fifteenth embodiments is applied as a method for transferring wireless packets between STAs in a Multi-Hop Wireless Network. In the following description, an example is described in which a frame aggregation method of the twelfth embodiment is applied. The thirteenth to fifteenth embodiments can be applied in a similar manner.

FIG. 26 shows the case where an STA (S1) 21 and an STA (S2) 22 transmit wireless packets to an STA (S4) 24 via an STA (S3) 23. When transferring data frames accumulated in a transmission buffer to the STA 24, the STA 23 selects two data frames respectively transmitted from the STAs 21 and 22 to the STA 24, adds addresses (S1 and S2) of the STAs 21 and 22 as source addresses SA to frame bodies of the two data frames, respectively, aggregates the frame bodies with the corresponding source addresses SA to each other, generates one wireless packet by adding a MAC header, and transmits the wireless packet in one lump.

The transmission in the opposite direction can be carried out in a similar manner. When transmitting data frames that are accumulated in the transmission buffer and are to be transmitted to the STAs 21 and 22 to the STA 23, the STA 24 adds addresses of the STAs 21 and 22 (S1 and S2) as destination addresses DA to frame bodies of the data frames, respectively, aggregates the frame bodies, generates one wireless packet by adding a MAC header, and transmits that wireless packet in one lump.

Embodiment 17

Figure 27:
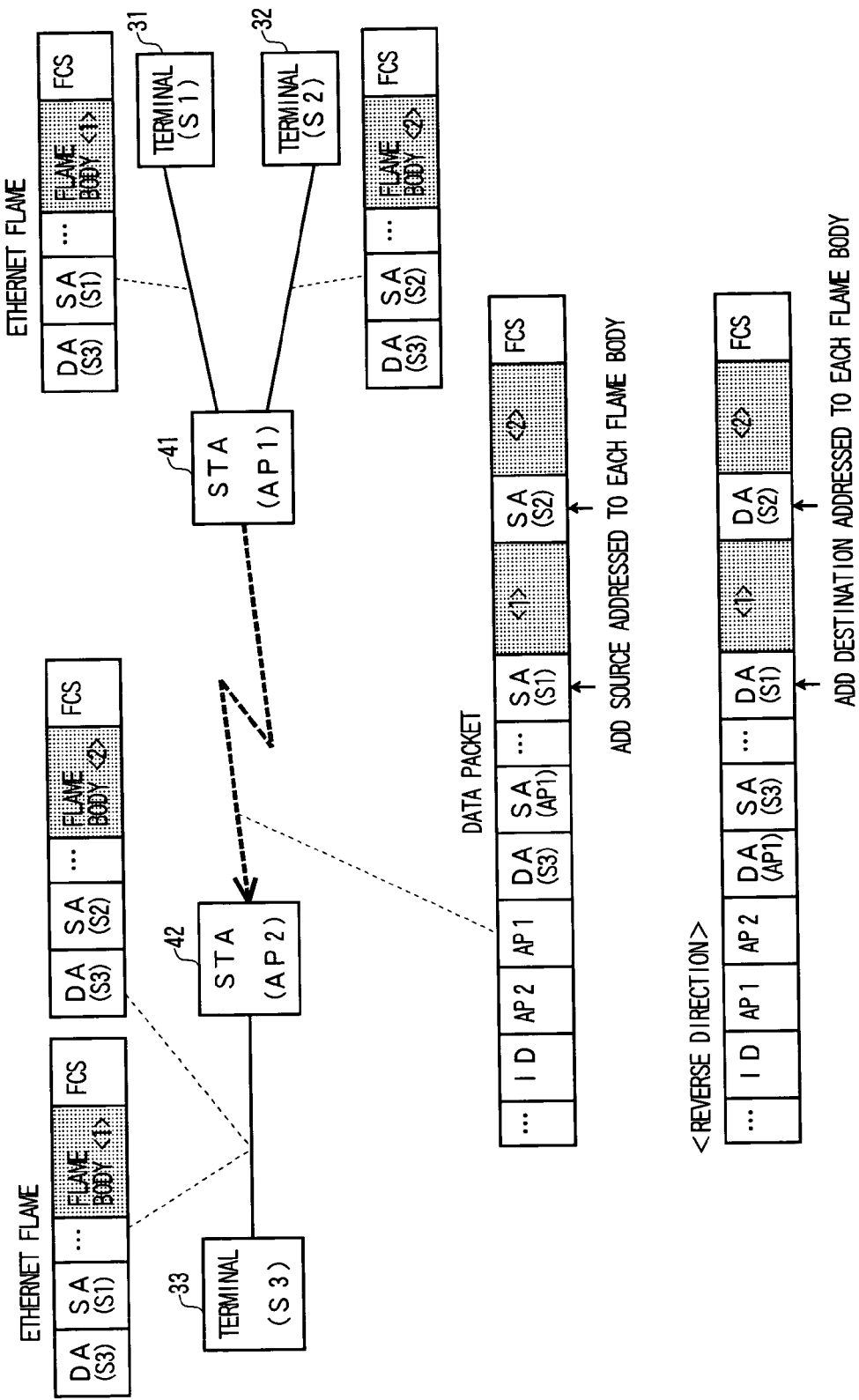
FIG. 27 is an exemplary frame format according to a seventeenth embodiment of the present invention.
Figure 28:
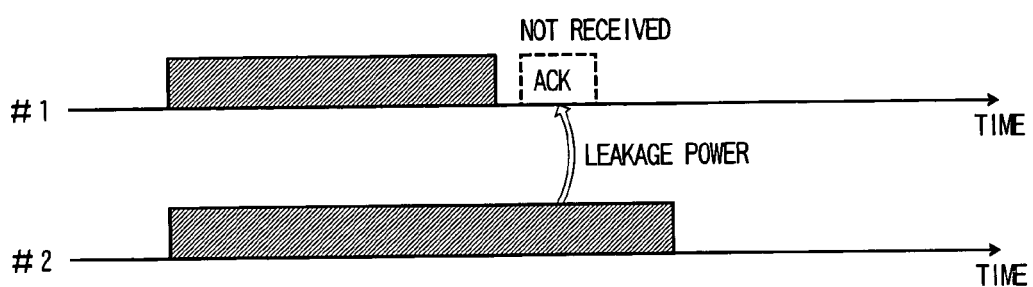
FIG. 28 is a time chart for explaining a problem in the case where center frequencies of a plurality of radio channels are close to each other.
Figure 29:
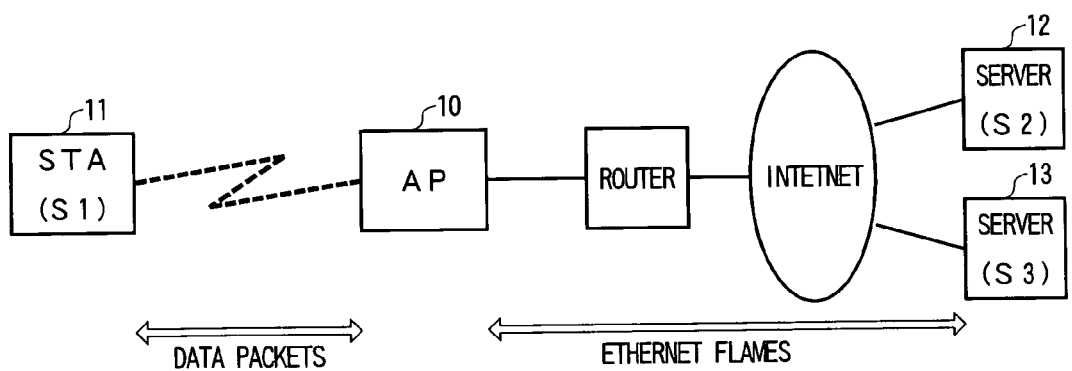
FIG. 29 is a diagram showing an exemplary configuration of a wireless LAN system.
Figure 30:
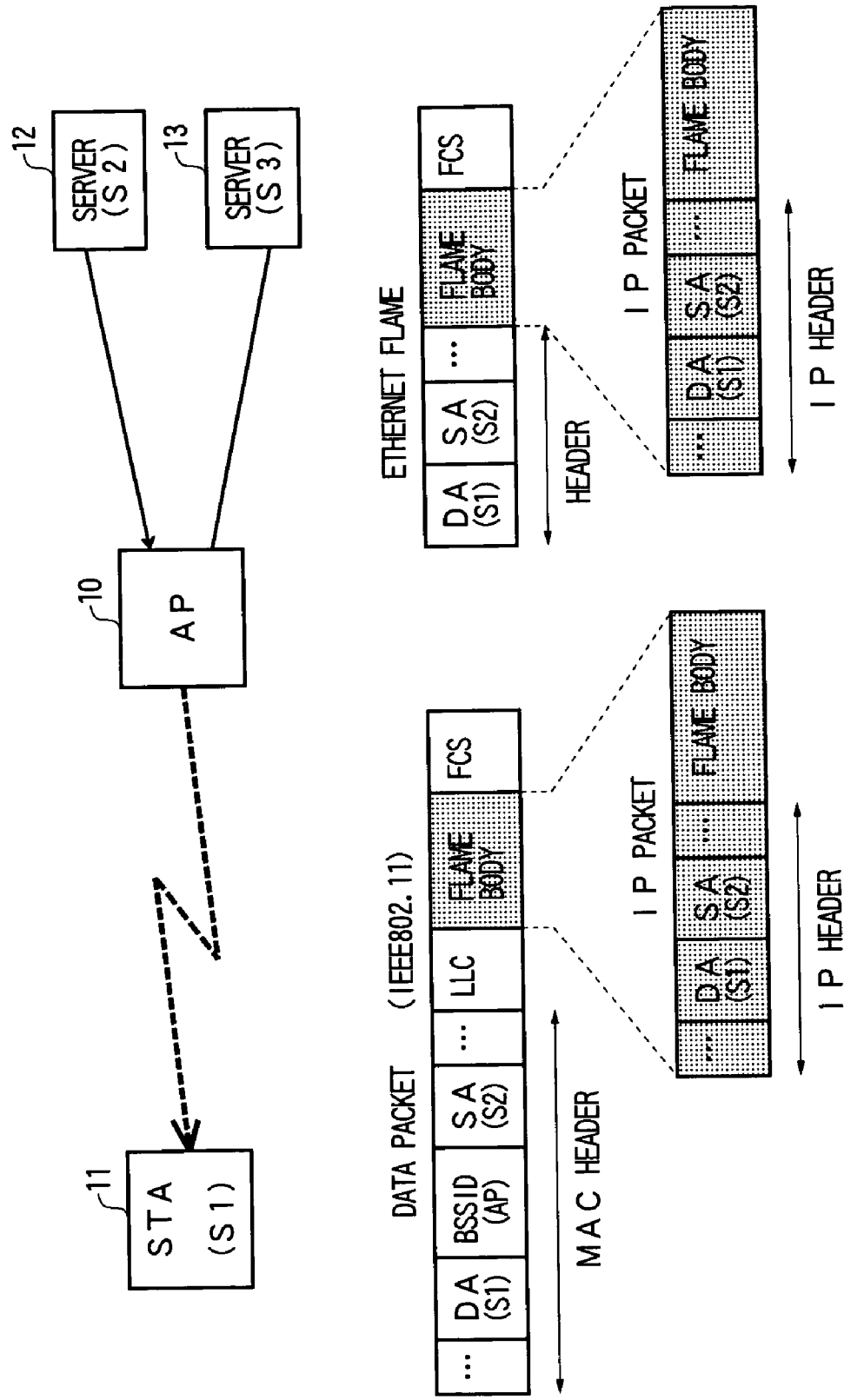
FIG. 30 is a diagram showing an exemplary frame format for a downlink of the wireless LAN system.
Figure 31:
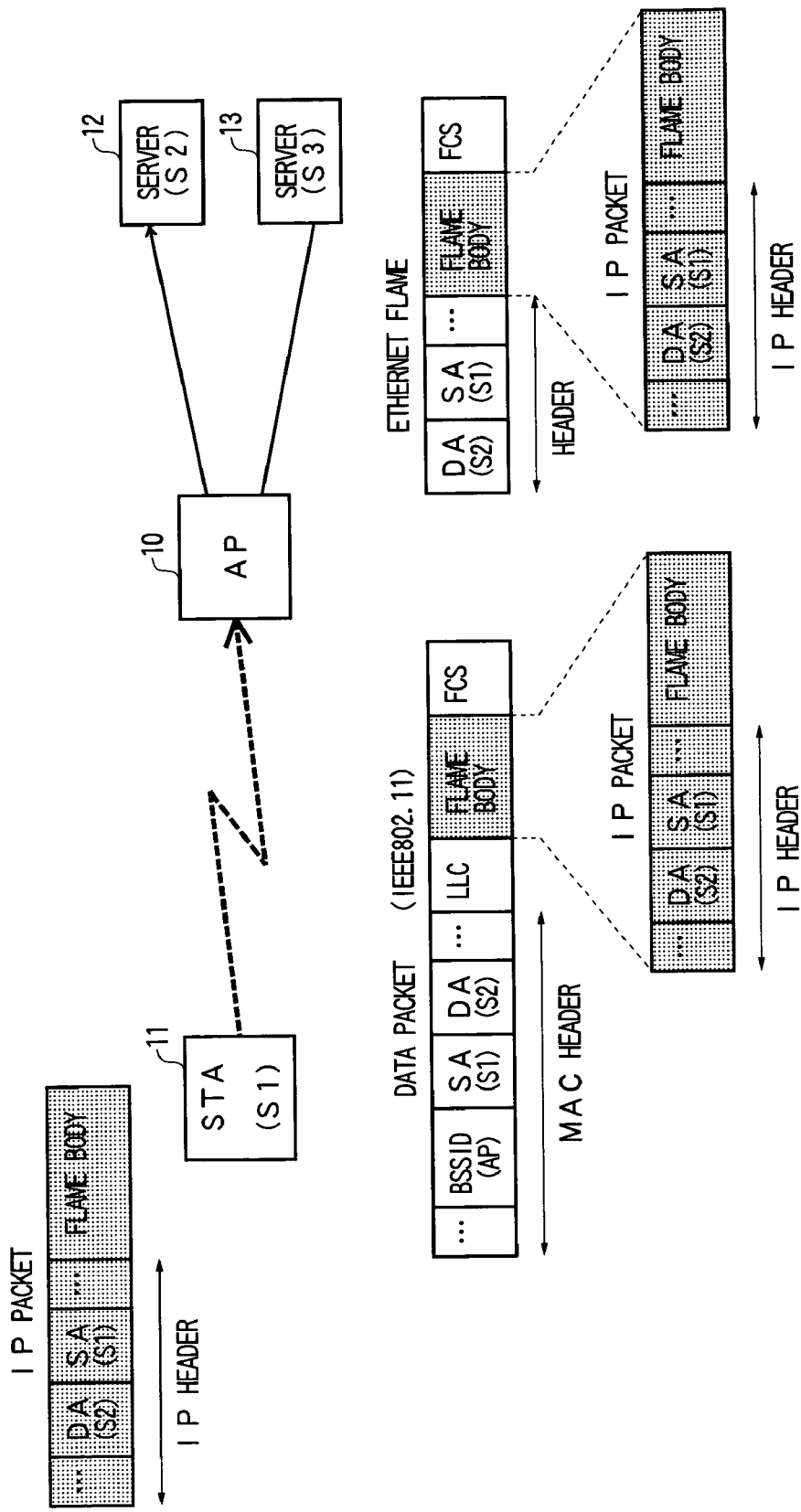
FIG. 31 is a diagram showing an exemplary frame format for an uplink of the wireless LAN system.

FIG. 27 shows an exemplary frame format according to a seventeenth embodiment of the present invention. In the present embodiment, the wireless packet communication method corresponding to any of the twelfth to fifteenth embodiments is applied as a method for transferring wireless packets between STAs in a Wireless Bridge. In the following description, an example is described in which the frame aggregation method of the twelfth embodiment is applied. The methods of the thirteenth to fifteenth embodiments can be applied in a similar manner.

FIG. 27 shows the case where, when a terminal (S1) 31 and a terminal (S3) 32 transmit Ethernet frames to a terminal (S3) 33, an STA (AP1) 41 connected to the terminals 31 and 32 and an STA (AP2) 42 connected to the terminal 33 intervene. When transferring Ethernet frames accumulated in a transmission buffer to the STA 42, the STA 41 selects two Ethernet frames respectively transmitted from the terminals 31 and 32 to the terminal 33, adds addresses (S1 and S2) of the terminals 31 and 32 as source addresses SA to frame bodies of the two Ethernet frames, respectively, aggregates the frame bodies with the corresponding source addresses SA to each other, generates one wireless packet by adding a MAC header, and transmits the wireless packet in one lump.

The transmission in the opposite direction can be carried out in a similar manner. When transferring Ethernet frames to the terminals 31 and 32 that are accumulated in the transmission buffer, to the STA 41, the STA 42 adds addresses (S1 and S2) of the terminals 31 and 32 as destination addresses DA to frame bodies of the selected Ethernet frames, respectively, aggregates the frame bodies with the destination addresses DA to each other, generates one wireless packet by adding a MAC header, and transmits that wireless packet in one lump.

The invention is not limited to the above embodiments and various modifications may be made without departing from the spirit and scope of the invention. Any improvement may be made in part or all of the components.

INDUSTRIAL APPLICABILITY

According to the present invention, it is possible to easily generate a plurality of data packets having the same packet time length from transmission-standby data frames in a transmission buffer in accordance with the number of the transmission-standby data frames and the number of idle channels, while effectively using the maximum size of a data field that can be accommodated in a MAC packet. Thus, if a plurality of radio channels are idle at the same time, the thus generated data packets can be transmitted simultaneously and the maximum throughput can be largely improved.

The invention claimed is:

1. A wireless packet communication method for transmitting X data packets simultaneously between two STAs over plural data transmission paths by using MIMO and a plurality of radio channels determined to be idle by carrier sense and/or by using a radio channel determined to be idle, X corresponding to a total number of MIMOs of the plurality of radio channels determined to be idle, where Dmax is a value corresponding to the maximum data size of the data packets, the wireless packet communication method comprising:
using at least one of the STAs to perform the following steps:
assessing the respective transmission rates of the plurality of data transmission paths and calculating a size ratio amongst the respective transmission rates, where the size ratio is a ratio between the respective transmission rates for each of the idle radio channels;
obtaining from a transmission buffer associated with one of the STAs at least one data frame to be transmitted;
fragmenting a data part extracted from a data field of the one data frame to be transmitted by applying the size ratio, to generate X data blocks such that each data block requires same amount of time for transmission from one STA to another STA;
generating X data packets by adding, to each data block of the X data blocks, a header field containing control information that includes destination information and an FCS field containing an error checking code;
transmitting the X data packets simultaneously over the plural data transmission paths; and
generating X new data packets after the simultaneous transmission of the X data packets and continuously transmitting the new data packets without performing carrier sense, until a time corresponding to a transmission time of data packets generated from the one data frame passes.

2. A wireless packet communication method for transmitting X data packets simultaneously between two STAs over plural data transmission paths by using MIMO and a plurality of radio channels determined to be idle by carrier sense and/or by using a radio channel determined to be idle, X corresponding to a total number of MIMOs of the plurality of radio channels determined to be idle, where Dmax is a value corresponding to the maximum data size of the data packets, the wireless packet communication method comprising:
using at least one of the STAs to perform the following steps:
assessing the respective transmission rates of the plurality of data transmission paths and calculating a size ratio amongst the respective transmission rates, where the size ratio is a ratio between the respective transmission rates for each of the idle radio channels;
obtaining from a transmission buffer associated with one of the STAs at least one data frame to be transmitted;
fragmenting a data part extracted from a data field of the one data frame to be transmitted by applying the size ratio, to generate X data blocks such that each data block requires same amount of time for transmission from one STA to another STA;
generating X data packets by adding, to each data block of the X data blocks, a header field containing control information that includes destination information and an FCS field containing an error checking code; and
transmitting the X data packets simultaneously over the plural data transmission paths; and
generating and consecutively transmitting X new data packets after the simultaneous transmission of the X data packets,
wherein the generating and consecutively transmitting step is performed X times without performing carrier sense.

3. A wireless packet communication apparatus for transmitting X data packets simultaneously between two STAs over plural data transmission paths by using a plurality of radio channels determined to be idle by carrier sense and/or by using a radio channel determined to be idle and MIMO, X corresponding to a total number of MIMOs of the plurality of radio channels determined to be idle, and Dmax corresponding to the maximum data size of said data packets, the wireless packet communication apparatus characterized by comprising:
a first unit to assess the respective transmission rates of said plurality of data transmission paths and calculate a size ratio amongst the respective transmission rates, where the size ratio is a ratio between the respective transmission rates for each of the idle radio channels;
a transmission buffer associated with one of said STAs configured to store at least one data frame to be transmitted;
a second unit generating X data blocks that have data fields equal to or smaller than Dmax and that have the same packet time length by fragmenting a data part extracted from a data field of said one data frame to be transmitted by applying said size ratio such that each data block requires same amount of time for transmission from one STA to another STA;
a third unit generating X data packets by adding, to each of said X data blocks, a header field containing control information that includes destination information and an FCS field containing an error checking code, to transmit said X data packets simultaneously; and
a fourth unit that transmits the X data packets simultaneously over said plural data transmission paths, wherein
for a time period corresponding to a transmission time of the data packets generated from the data frame, the third unit generates X new data packets the simultaneous transmission of the X data packets, and the fourth unit continuously transmits the X new data packets without performing carrier sense, until a time corresponding to a transmission time of data packets generated from said one data frame before being fragmented passes.

4. A wireless packet communication apparatus for transmitting X data packets simultaneously between two STAs over plural data transmission paths by using a plurality of radio channels determined to be idle by carrier sense and/or by using a radio channel determined to be idle and MIMO, X corresponding to a total number of MIMOs of the plurality of radio channels determined to be idle, and Dmax corresponding to the maximum data size of said data packets, the wireless packet communication apparatus characterized by comprising:

- a first unit to assess the respective transmission rates of said plurality of data transmission paths and calculate a size ratio amongst the respective transmission rates, where the size ratio is a ratio between the respective transmission rates for each of the idle radio channels;
- a transmission buffer associated with one of said STAs configured to store at least one data frame to be transmitted;
- a second unit generating X data blocks that have data fields equal to or smaller than Dmax and that have the same packet time length by fragmenting a data part extracted from a data field of said one data frame to be transmitted by applying said size ratio such that each data block requires same amount of time for transmission from one STA to another STA;
- a third unit generating X data packets by adding, to each of said X data blocks, a header field containing control information that includes destination information and an FCS field containing an error checking code, to transmit said X data packets simultaneously; and
- a fourth unit that transmits the X data packets simultaneously over said plural data transmission paths, wherein for X consecutive iterations, the third unit generates and consecutively transmits X new data packets after the simultaneous transmission of the X data packets without performing carrier sense.

* * * * *